US008649653B2

(12) United States Patent
Tanaka et al.

(10) Patent No.: US 8,649,653 B2
(45) Date of Patent: Feb. 11, 2014

(54) REPRODUCTION DEVICE, REPRODUCTION METHOD, AND PROGRAM

(75) Inventors: Keiichi Tanaka, Osaka (JP); Takahiro Yamaguchi, Osaka (JP); Ken Yamashita, Nara (JP)

(73) Assignee: Panasonic Corporation, Osaka (JP)

( * ) Notice: Subject to any disclaimer, the term of this patent is extended or adjusted under 35 U.S.C. 154(b) by 268 days.

(21) Appl. No.: 12/989,872

(22) PCT Filed: Jul. 14, 2009

(86) PCT No.: PCT/JP2009/003282
§ 371 (c)(1),
(2), (4) Date: Oct. 27, 2010

(87) PCT Pub. No.: WO2010/007757
PCT Pub. Date: Jan. 21, 2010

(65) Prior Publication Data
US 2011/0052153 A1 Mar. 3, 2011

(30) Foreign Application Priority Data

Jul. 16, 2008 (JP) .................................. 2008-184871

(51) Int. Cl.
*H04N 5/932* (2006.01)
(52) U.S. Cl.
USPC ............................. 386/215; 386/216; 386/218
(58) Field of Classification Search
USPC .......................................... 386/215, 216, 218
See application file for complete search history.

(56) References Cited

U.S. PATENT DOCUMENTS

| 6,874,130 | B1* | 3/2005 | Baweja et al. ................. 715/805 |
| 7,502,294 | B2* | 3/2009 | Senshu et al. .............. 369/53.12 |
| 7,515,812 | B2 | 4/2009 | Ikeda et al. |
| 7,835,625 | B2* | 11/2010 | Hashimoto et al. ........... 386/241 |
| 2003/0070001 | A1* | 4/2003 | Belknap et al. ................ 709/321 |
| 2006/0280434 | A1 | 12/2006 | Suzuki et al. |
| 2006/0282612 | A1 | 12/2006 | Ikeda et al. |
| 2007/0086345 | A1 | 4/2007 | Yashima et al. |
| 2007/0089146 | A1 | 4/2007 | Ikeda et al. |
| 2007/0089156 | A1 | 4/2007 | Ikeda et al. |
| 2007/0220021 | A1* | 9/2007 | Kato et al. ..................... 707/100 |
| 2007/0274680 | A1 | 11/2007 | Ikeda et al. |
| 2008/0075419 | A1* | 3/2008 | Okubo et al. ................... 386/66 |
| 2008/0205859 | A1 | 8/2008 | Ikeda et al. |
| 2008/0304811 | A1 | 12/2008 | Ikeda et al. |
| 2008/0307158 | A1* | 12/2008 | Sinclair ......................... 711/103 |
| 2009/0165024 | A1 | 6/2009 | Ikeda et al. |

FOREIGN PATENT DOCUMENTS

| EP | 1675119 | 6/2006 |
| EP | 1886490 | 4/2009 |
| JP | 2006-012369 | 1/2006 |

(Continued)

*Primary Examiner* — Thai Tran
*Assistant Examiner* — Jose Mesa
(74) *Attorney, Agent, or Firm* — Greenblum & Bernstein, P.L.C.

(57) ABSTRACT

A problem with high resource-consuming managed copy is that simultaneous execution of the managed copy, which is controlled by a playback device, and a BD-J application, which is recorded on a recording medium, leads to a shortage in resources. Provided is a playback device that enables simultaneous execution of the managed copy and the BD-J application while preventing resource contention therebetween, by imposing an access limitation on the disc medium by causing the BD-J application to assume that the disc medium has been virtually ejected.

14 Claims, 26 Drawing Sheets

(56) References Cited

FOREIGN PATENT DOCUMENTS

| | | |
|---|---|---|
| JP | 2007/109080 | 4/2007 |
| JP | 2008-098765 | 4/2008 |
| WO | 2005/036547 | 4/2005 |
| WO | 2006/129818 | 12/2006 |

* cited by examiner

Normal playback in HDMV mode

Creation of added value in BD-J mode

FIG. 15

File name conversion table (filename.tbl)

| Before conversion | After conversion |
|---|---|
| CERTIFICATE | CERT |
| BDMV/index.bdmv | BDMV/index.bdm |
| BDMV/MovieObject.bdmv | BDMV/MovieObj.bdm |
| BDMV/PLAYLIST/xxx.mpls | BDMV/PLAYLIST/xxx.mpl |
| BDMV/CLIPINF/xxx.clpi | BDMV/CLIPINF/xxx.clp |
| BDMV/STREAM/xxx.m2ts | BDMV/STREAM/xxx.m2t |
| BDMV/BDJO/xxx.bdjo | BDMV/BDJO/xxx.bdj |
| BDMV/JAR/99999/topmenu_img.png | BDMV/JAR/99999/topmenu0.png |
| BDMV/JAR/99999/topmenu_img2.png | BDMV/JAR/99999/topmenu1.png |

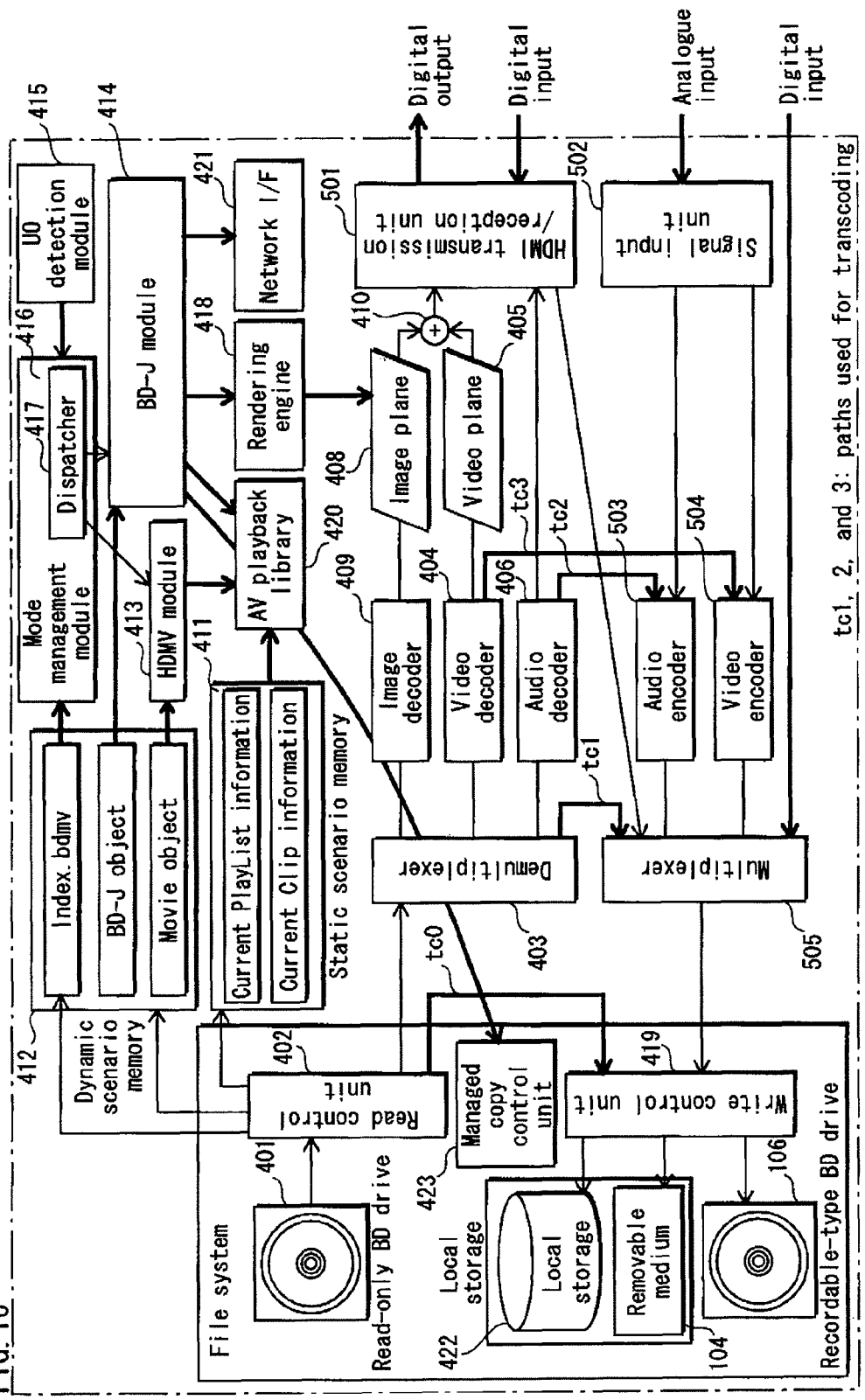

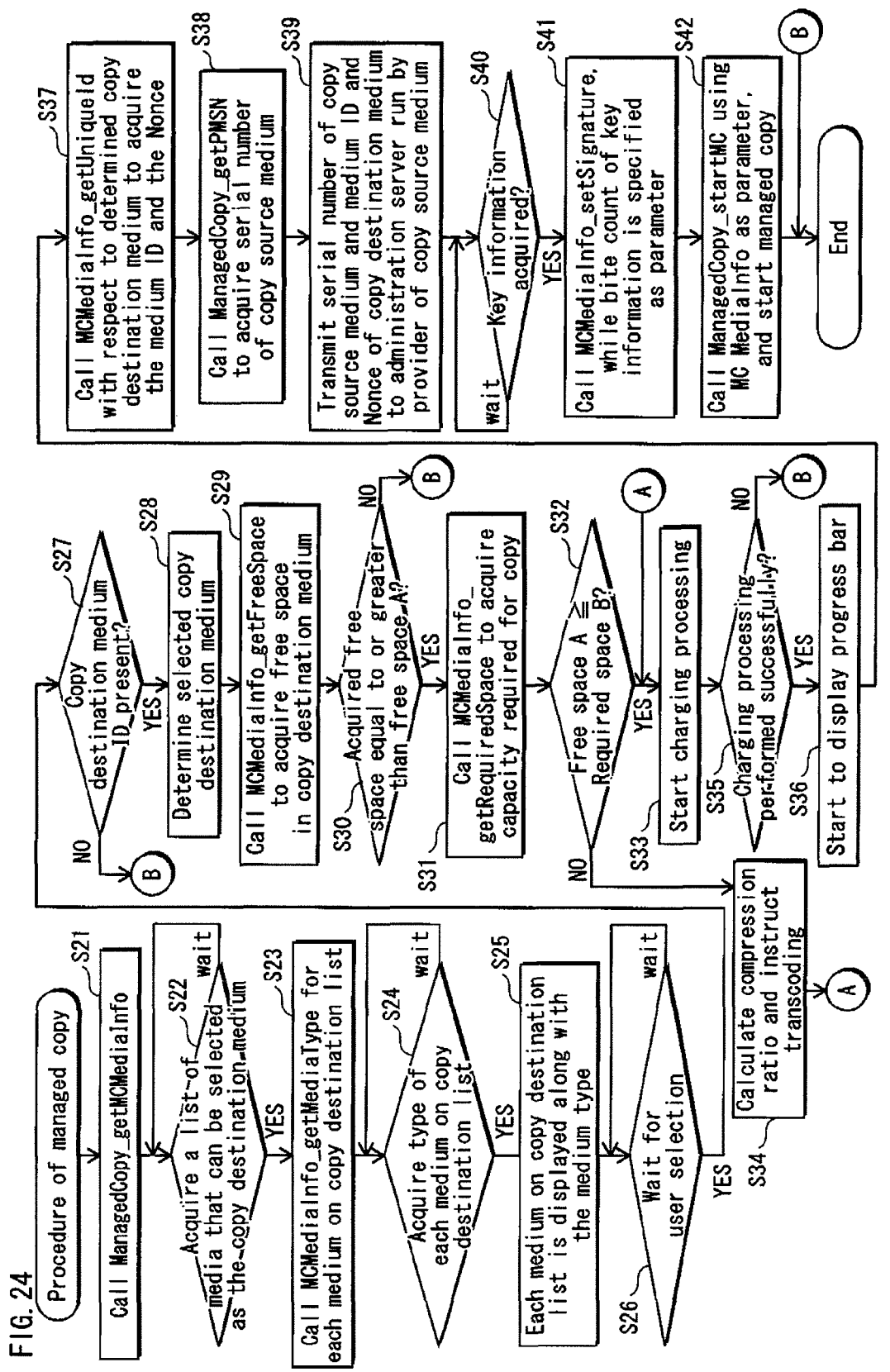

REPRODUCTION DEVICE, REPRODUCTION METHOD, AND PROGRAM

TECHNICAL FIELD

The present invention relates to a playback device for playing back video data recorded on a recording medium, such as a BD-ROM (Blu-ray Disc Read Only Memory), and in particular to a technology (managed copy) for copying the video data recorded on the recording medium to another recording medium.

BACKGROUND ART

Managed copy refers to a technology for allowing copying of a digital stream and an application program (referred to below as an "application") recorded in a read-only recording medium, such as a BD-ROM, to another readable and writable recording medium only if the copying is authorized and permitted through communication with a server in advance, rather than allowing it without limitation. Specific examples of the readable and writable recording medium include an optical disc (e.g. BD-R, BD-RE, DVD-R, DVD-RW, and DVD-RAM), a hard disk, and a removable medium (e.g. SD memory card, memory stick, Compact Flash™, smart media, and multimedia card). The technology enables copy control to restrict the number of times for which the backup is made or permitting only the backup charged, for example. The technology, therefore, relaxes strict prohibition on making the backup of the BD-ROM and allows the backup to be executed under management. This improves convenience in the BD-ROM viewing.

The following Patent Literature describes a conventional technology relating to the managed copy.

CITATION LIST

Patent Literature

[Patent Literature 1]
Japanese Patent Application Publication No. 2008-98765

SUMMARY OF INVENTION

Technical Problem

If leaving the management of managed copy entirely to the control of a playback device, the content distributor loses a way to offer its unique management. In this case, the distributor cannot implement features for adopting its unique accounting method and for making use of the time spent for the copy, for example by, inserting an advertisement during the copy, and operating a simple game application during the copy time so that a user does not get bored. However, since the managed copy consumes a lot of resources, if an application stored on a recording medium device is executed simultaneously with the managed copy by the playback, resources might run out. For example, a backup from a BD-ROM to a DVD-R requires recompressing and encrypting of the digital stream, in addition to data reading from the BD-ROM and data writing into the DVD-R. Executing the application during the backup entails a variety of problems, such as a shortage in a memory, collision between simultaneous data reading from the BD-ROM, and collision between simultaneous playback and recompression of the digital stream. If an application is executed during the managed copy, and the copy fails due to the shortage in resources, it causes a serious trouble to the user who has been already charged for the managed copy.

As a way to prevent the stated contentions, an idea has been suggested that the operations of all applications should be terminated while the managed copy is executed. However, the termination of all the applications in operation for the purpose of avoiding the resource contention between the managed copy brings about another problem. That is to say, any application cannot perform processes related to the managed copy other than copying, such as charging and progress display. In this case, a resident program of the playback device needs to perform those processes instead. However, since accounting (i.e. clearance) methods often differ between one content distributor to another, the manufacturer of the playback device needs to support various clearance methods specified by different distributors so that any charging processing for the managed copy may be performed. Supporting the various clearance methods for different distributors significantly increases loads of the manufacturer of the playback device, resulting in little possibility of the managed copy being adopted in home appliances.

The present invention is conceived in view of the above problems, and it is an object of the present invention to provide a playback device which is capable of executing the managed copy and application(s) simultaneously, while also preventing the resource contention caused by the executed managed copy and application(s).

Solution to Problem

In order to solve the above problems, one aspect of the present invention is a playback device that performs playback control and copy control on a first recording medium and a second recording medium while executing an application, the device comprising: a platform on which the application is executed; and a playback unit, wherein the playback control is processing to read data from the first recording medium and supply the read data to the playback unit, in response to a playback request issued by the application through an I/O module in the platform, the copy control is processing to read data from the first recording medium, and write the read data into the second recording medium without passing through the I/O module, and during the copy control, the I/O module rejects a request from the application.

Advantageous Effects of Invention

Under the copy control, the I/O module within the platform rejects a playback command from the application. As a result, playback is prohibited even if a playback request is made by the application during the managed copy. This prevents resource contention between pickup control, encoder, and decoder which are utilized in reading, compression, and decoding of a digital stream, respectively.

Furthermore, not all the applications in operation are terminated while the managed copy is executed. Due to this, a user interface engaged in the copy operation may be controlled, for example by using an API that is available for an application in operation.

Accordingly, a PR/advertisement may be displayed during the copy. Further, it is not necessary for the player to have a user interface for the managed copy. This reduces an implementation cost in the playback device. Furthermore, in the managed copy, communication with the server is completed solely by individual applications. Accordingly, no limitation is imposed to the production studio of the content, in terms of type of a protocol that is used in the communication. The flexibility in choosing the communication protocol enables the studio to adopt its unique protocol to perform the clearance for the managed copy. Moreover, there is no need for the playback device to implement a communication module peculiar to the resident program in order to communicate with the server. This reduces an implementation cost.

Besides, by adopting the present invention, the content provider is able to permit users to copy the BD-ROM and collect a charge for the copy via the network. In the charge collection, the content provider can adopt its own clearance method. Accordingly, it is easy to deploy a business model where the content provider develops a primary profit by distributing movie works on BD-ROMs and then develops a secondary profit by permitting users to copy the BD-ROMs. This provides a new business chance to the content provider.

Furthermore, although optional, during data reading from the first recording medium and data writing into the second recording medium by the copy control unit, it is preferable that the I/O module and the medium playback module are in a rejecting state of rejecting a request from the application, and the application performs the processing that is executable without using the first recording medium. Once the I/O module and the medium playback module make transitions to an accepting state of accepting a request from the application, it is preferable that the application performs processing that is executable using the first recording medium.

Even if the application requests an access to the data on the BD-ROM during the managed copy, the BD-ROM as the first recording medium is assumed to have been virtually ejected. Since the data to be accessed is assumed to be missing even when the data is actually present, the access is made to fail. As a result, the collision in the BD-ROM reading is prevented.

Furthermore, although optional, it is preferable that, if the data reading from the first recording medium or the data writing into the second recording medium has failed, the notification unit notifies the application registered by the registration API that the copy control by the copy control unit has failed.

In this case, when the copy fails, for example because the medium has been forcedly ejected during the copy, the application is able to receive a copy failure notification. Accordingly, the copy failure can be addressed, for example by canceling a charge imposed prior to the copy.

Furthermore, although optional, it is preferable that the playback device further comprises a progress management unit, and wherein the progress management unit notifies the application of a size of data that has been written to the second recording medium and a size of data that remains to be written, in response to a call for a size notification API made by an application.

Since assuming the disc to have been virtually ejected, the application is not able to access the data on the BD-ROM. However, the application is able to recognize the start/end and progress of the copy. Accordingly, during the copy, it is possible to display a progress bar indicating the progress, a remaining time, or a PR/advertisement, or execute a game application.

BRIEF DESCRIPTION OF DRAWINGS

FIG. 15 shows an example of a file name conversion table in the second embodiment.
FIG. 16 shows a general internal structure of a recording/playback device to which the constituent components for the transcoding are added.
FIG. 24 is a flowchart showing usage of the APIs in a processing procedure of the BD-J application performing the copy control.

DESCRIPTION OF EMBODIMENTS

Embodiments of the present invention are described below with reference to the drawings.

First Embodiment

Figure 1:
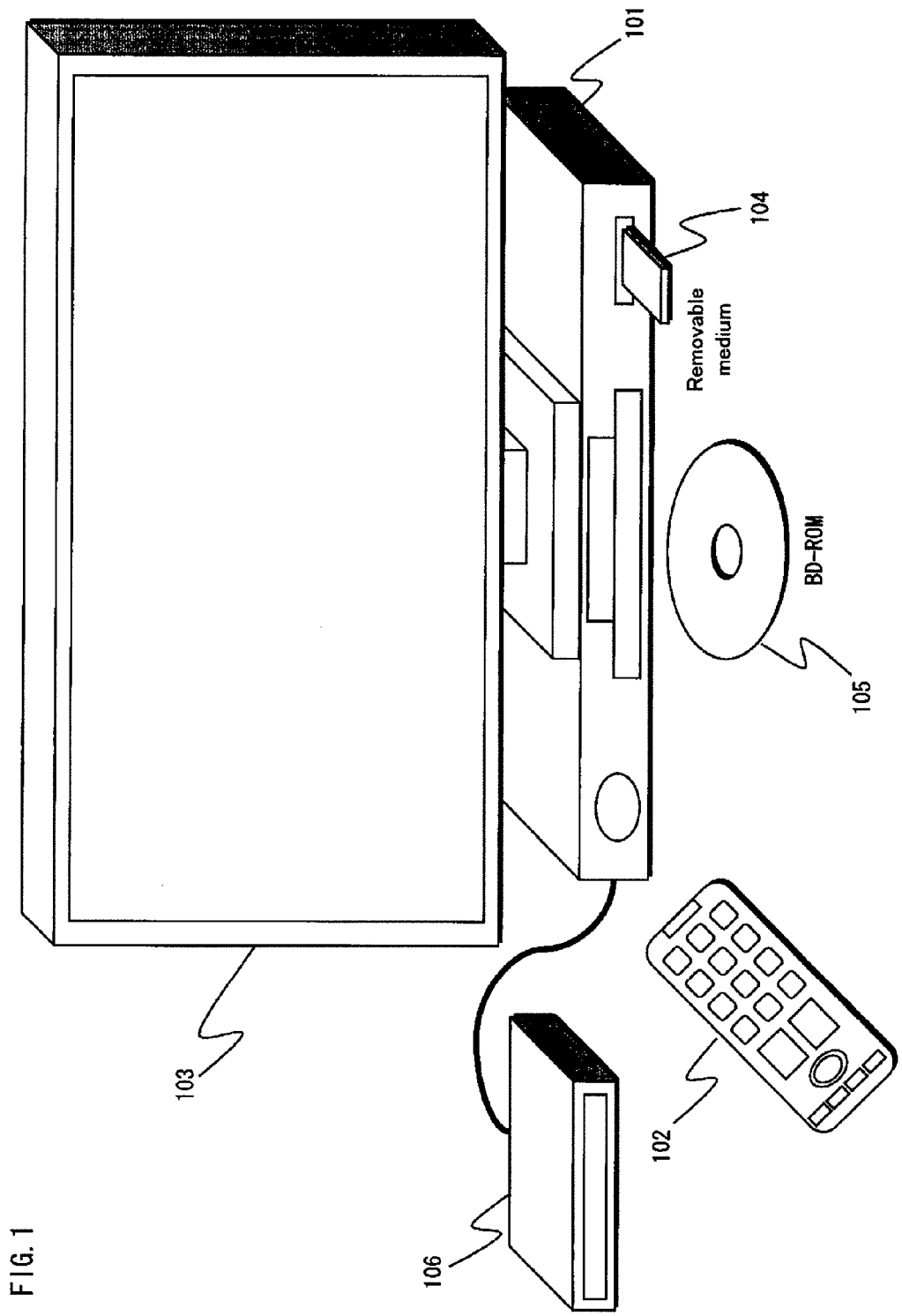
FIG. 1 shows a system in a first embodiment.

To begin with, a description is given of a usage pattern among implementation patterns of a playback device according to the present invention. FIG. 1 shows an example of the usage pattern of the playback device according to the present invention. In FIG. 1, the playback device according to the present invention is shown as a playback device 101. The playback device 101 is used to supply a movie to a home theater system composed of a remote control 102 and a TV 103, for example. The playback device 101 is provided with an insertion slot to which a removable medium 104, such as SD memory card, memory stick, Compact Flash™, smart media, and multimedia card, is inserted, and another insertion slot to which an external BD drive 106 is inserted.

This concludes the description on the use pattern of the playback device according to the present invention. A description is next given of the recording medium which is to be played back by the playback device according to the present invention. In this example, it is an optical disc, namely a BD-ROM 105, that is played back by the playback device according to the present invention.

Figure 2:
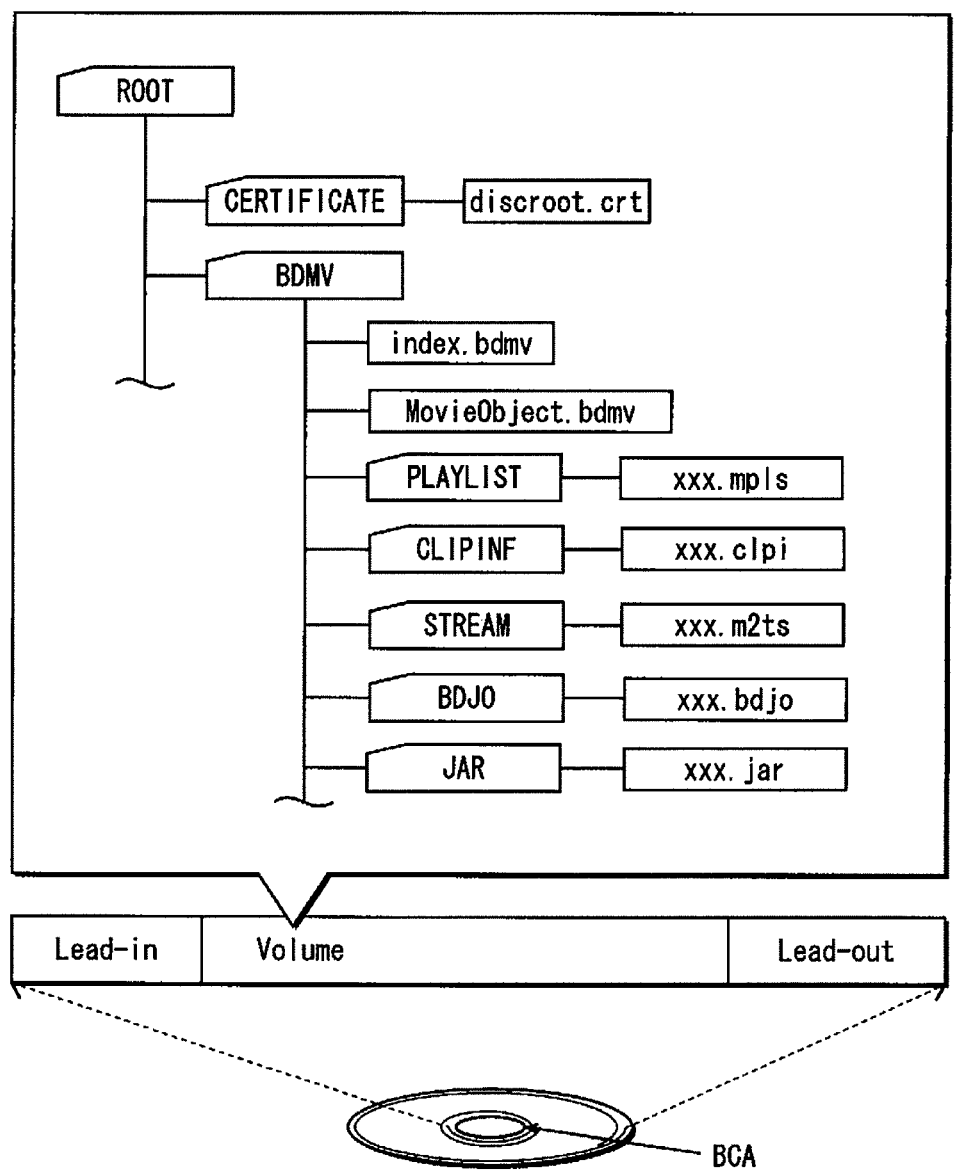
FIG. 2 shows a data hierarchy of a BD-ROM in the first embodiment.

FIG. 2 shows the structure of the BD-ROM (which may be referred to below as a "BD"). In the present embodiment, the description about the BD-ROM is given while focusing on an AV application for playing back an AV content, such as a movie. Naturally, however, the BD-ROM may be used as a recording medium for computer use, such as a CD-ROM and a DVD-ROM. Like other optical discs, such as a DVD and a CD, the BD-ROM has a storage area formed in a spiral from the inner to the outer circumference. The storage area has a logical address space for storing logical data between a lead-in area provided along the inner circumference and a lead-out area provided along the outer circumference. A special area called BCA (Burst Cutting Area) is provided inside the lead-in area. Only the BD-ROM drive is permitted to access the BCA, and the access by an application programs is prohibited. The BCA is therefore used for the sake of a copyright protection technology and stores a PMSN (Pre-recorded Media Serial Number) indicating a physical serial number of the recording medium.

The logical address space stores application data, such as video data, starting from file system (volume) information. The file system is UDF or ISO9660, for example. Like an ordinary PC, the logical data recorded on the logical address space may be read with use of a directory/file structure as identified with a directory/file name in 255 letters at most.

In the directory/file structure on the BD-ROM disc in the present embodiment, a BDMV directory and a CERTIFICATE directory are located immediately below a ROOT directory. The BDMV directory stores data, such as an AV content and management information, that is handled on the BD-ROM. The CERTIFICATE directory stores certificate information that is used for the purpose of signature verification of an application.

Under the BDMV directory, the following five sub-directories exist: a PLAYLIST directory; a CLIPINF directory; a STREAM directory; a BDJO directory; and a JAR directory. Two types of files of index.bdmv and MovieObject.bdmv are located in the BDMV directory.

The STREAM directory stores a file that forms the so-called body of a digital stream and is appended with the file extension M2TS (i.e. xxx.m2ts, where "xxx" is variable whereas the extension "m2ts" is fixed). In the PLAYLIST directory is a file appended with the file extension mpls (i.e. xxx.mpls, where "xxx" is variable whereas the extension "mpls" is fixed). In the CLIPINF directory is a file appended with the file extension clpi (i.e. xxx. clpi, where "xxx" is variable whereas the extension "clpi" is fixed). In the JAR directory is a file appended with the file extension jar (i.e. xxx.jar, where "xxx" is variable whereas the extension "jar" is fixed). In the BDJO directory is a file appended with the file extension bdjo (i.e. xxx.bdjo, where "xxx" is variable whereas the extension "bdjo" is fixed).

The file with the extension "m2ts" stores a digital AV stream in the MPEG-TS (Transport Stream) format which is obtained by multiplexing a video stream, at least one audio stream, and at least one sub-video stream. The video stream refers to a video part of the movie, the audio stream refers to an audio part of the movie, and the sub-stream refers to a subtitle of the movie.

The file with the extension "clpi" stores clip (Clip) information assigned to a digital AV stream file on a one-to-one basis. The Clip information as management information has information indicating the encoding method, frame rate, bit rate, resolution, and others of the corresponding digital AV stream, as well as EP_map indicating starting positions of GOPs in the stream.

The file with the extension "mpls" stores playlist (PlayList) information that includes information of playback segments ("In Time/Out Time") with respect to streams.

The file with the extension "jar" is a Java™ archive file. In the file, a program of the Java application for performing dynamic scenario control using the Java virtual machine is described. This file is necessary if it is demended to control the playback of each Title, namely a unit of playback, of a content on the BD-ROM by the Java application.

The file with the extension "bdjo" stores a BD-J object. The BD-J object is information that defines a Title according to a relation between an application and an AV stream indicated by the PlayList information. The BD-J object represents an "application management table" and a list of PlayLists that can be played back in the Title. The application management table indicates the application whose life cycle is bound by the Title, by showing the identifier of the application (application ID) and a list of the IDs of the Java archive files that belong to the application. That is to say, one application is constituted by one or more Java archive files.

The index.bdmv (fixed file name) stores management information with respect to the BD-ROM as a whole. The index.bdmv includes information, such as an organization ID (32 bits) that is an identifier of the provider of the movie work and a disc ID (128 bits) that is an identifier uniquely assigned to the BD-ROM provided by the provider. After a BD-ROM is inserted into the playback device, the index.bdmv is read first so that the disc is uniquely recognized by the playback device. Besides, the index.bdmv includes a table indicating a plurality of Titles playable in the BD-ROM and BD-J Objects defining the playable Titles, in one-to-one correspondence.

The MovieObject.bdmv (fixed file name) stores a scenario program describing a scenario that is used to dynamically change the progress of the playback of each Title when it is played back in the HDMV mode (which will be described later).

Figure 3:
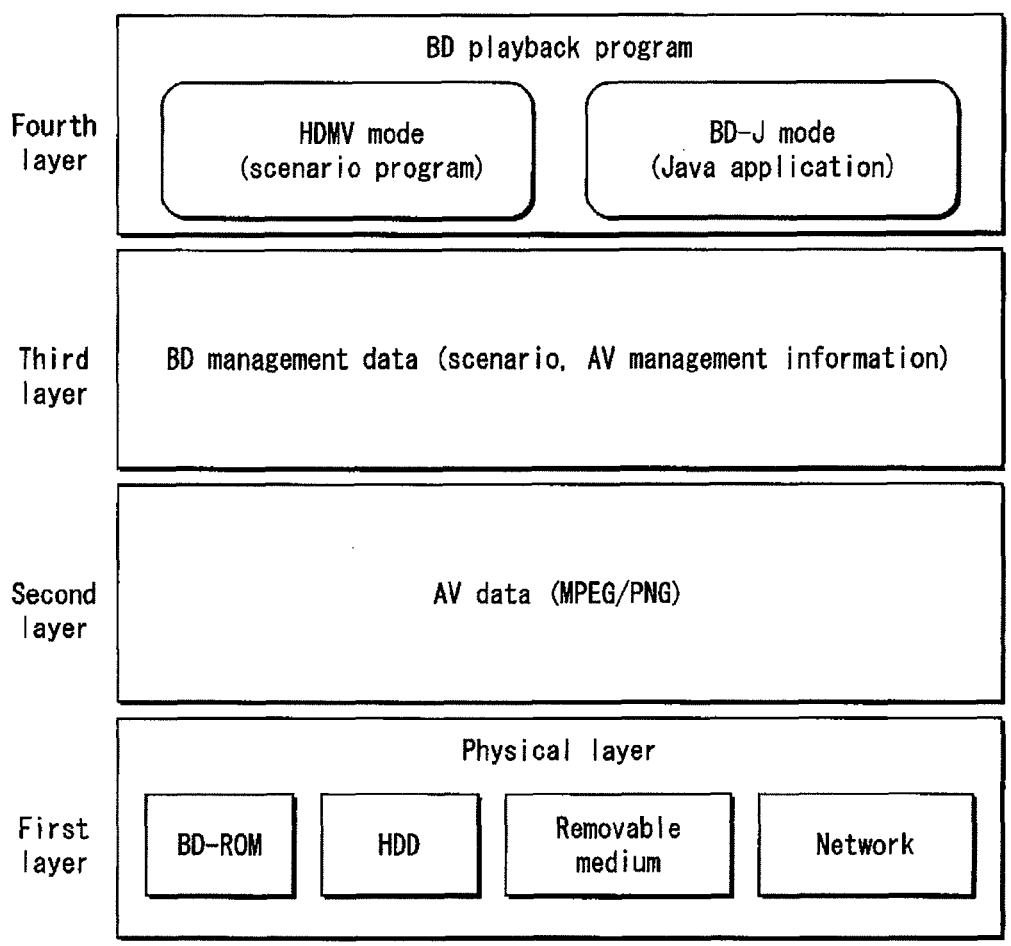
FIG. 3 shows a layer model of software for the BD-ROM in the first embodiment.

FIG. 3 shows a layer model for the playback control. The first layer in FIG. 3 shows a physical layer that controls supply of the main body of the stream to be processed. As shown in the first layer, in addition to the BD-ROM, any recording media and communication media can be the supply source of the stream to be processed. These recording media are represented by the local storage, the removable medium, and the network. The built-in medium is a recording medium that is preliminarily built in the playback device, such as HDD (Hard Disk Drive). The first layer controls such supply sources as the local storage, the removal medium, and the network (in terms of disk access, card access, and network communication).

The second layer is a layer of the AV stream. The second layer defines the type of a decoding method used to decode the stream supplied by the first layer.

The third layer (BD management data) defines a static scenario of the stream. The static scenario is the playback path information and the stream management information, both of which is preliminarily defined by the disc author. The third layer defines a playback control based these information.

The fourth layer (BD playback program) is a layer that defines a dynamic scenario of the stream. The dynamic scenario is a program which performs at least one of a procedure for playing back the AV stream and a procedure for controlling the playback. The playback control by the dynamic scenario varies depending on the user operation made onto the device, and has the nature of a program. The dynamic playback control herein has two modes. One is an HDMV mode in which the video data recorded on the BD-ROM is played back in a playback environment peculiar to the AV apparatus. The other is a BD-J mode in which the video data recorded on the BD-ROM is played back while creating added value in the video data. In FIG. 3, the two modes of the HDMV mode and the BD-J mode are shown in the fourth layer. In the HDMV mode, which is a DVD-like playback environment, the playback is performed by operating the scenario program in which a scenario for dynamically varying the progress of the playback is described. In the BD-J mode, which is a playback mode operated by the Java virtual machine, the playback is controlled by a Java application.

Figure 4A:
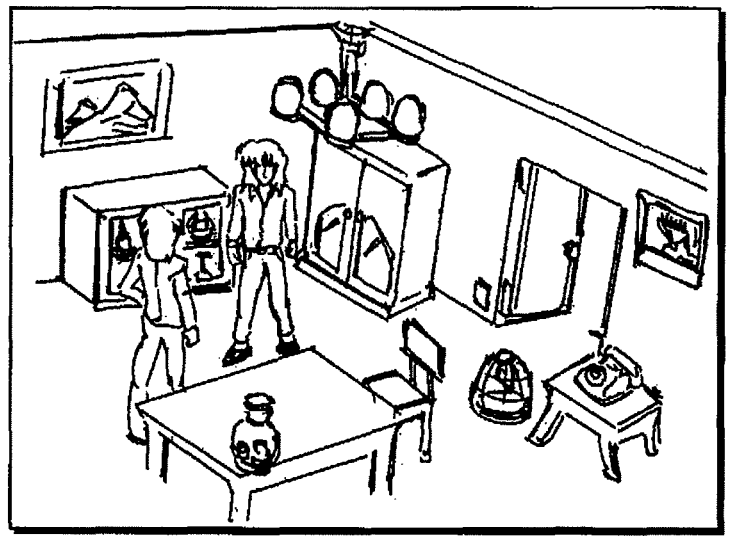
FIG. 4A and FIG. 4B show a movie played back by dynamic playback control that is performed in two modes different from each other in the first embodiment.

FIG. 4 shows a movie work created by dynamic playback control in two modes. FIG. 4A shows a scene of the movie work that is created by defining the dynamic playback control in the HDMV mode. In the HDMV mode, the playback control may be described with use of commands that resemble the commands interpretable by the DVD playback device, and thus it is possible to define the playback control in which the playback progresses in accordance with selections made on the menu.

Figure 4B:

FIG. 4B shows a scene of the movie work that is created by defining the dynamic playback control in the BD-J mode. In the BD-J mode, the control procedure may be described in a Java language which is the language interpretable by the Java virtual machine. Providing that the playback control constitutes control for computer graphics (CG) operations, then, in the BD-J mode, it is possible to define the playback control in which CG (i.e. an owl animation in the figure) is moving about by the screen on which the video is being displayed.

Figure 5:
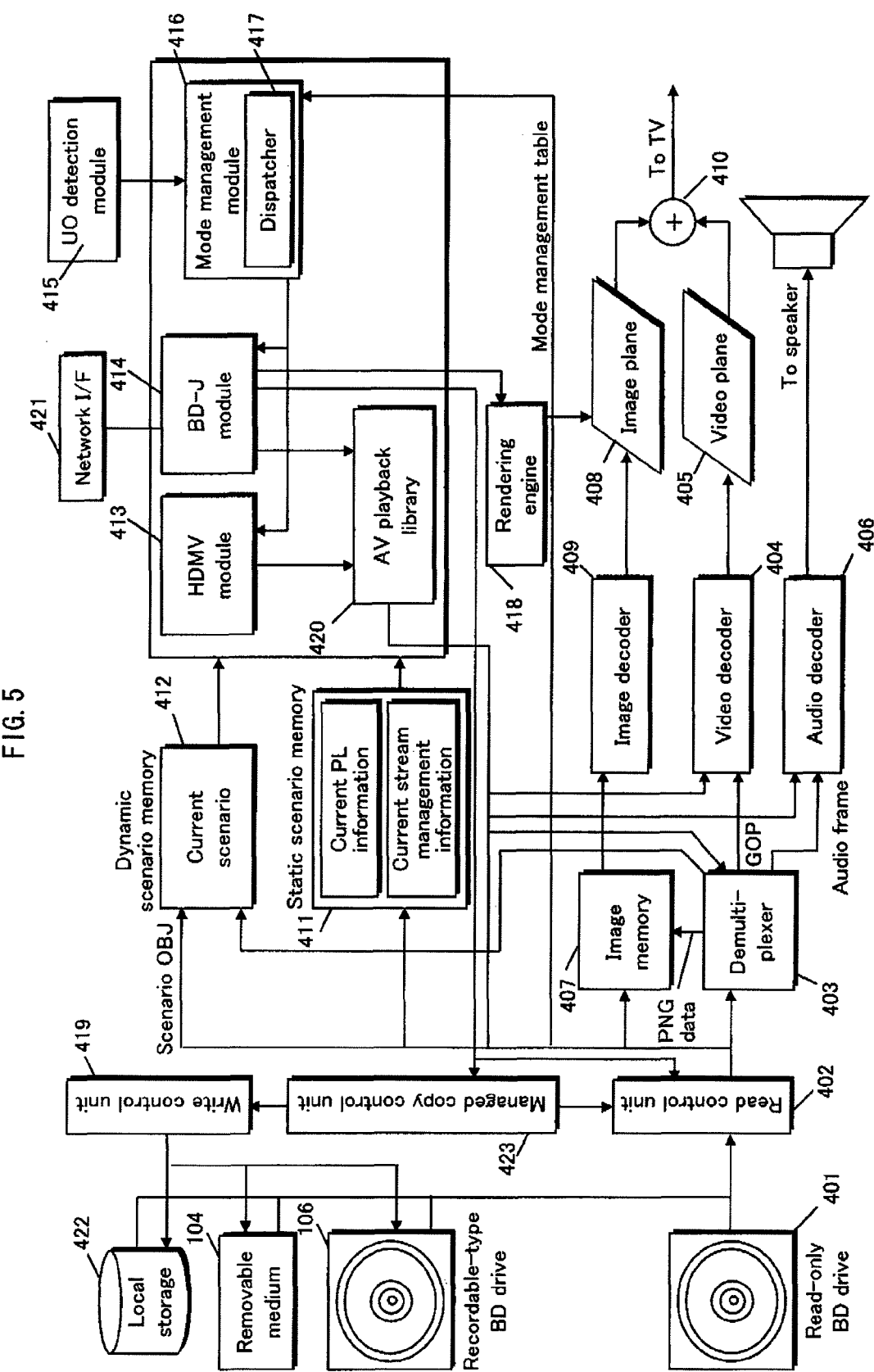
FIG. 5 shows an internal structure of a playback device in the first embodiment.

FIG. 5 is a block diagram that roughly shows a functional structure of the playback device. As shown in FIG. 5, the playback device includes a BD-ROM drive 401, a read control unit 402, a demultiplexer 403, a video decoder 404, a video plane 405, an audio decoder 406, an image memory 407, an image plane 408, an image decoder 409, an adder 410, a static scenario memory 411, a dynamic scenario memory 412, an HDMV module 413, a BD-J module 414, an UO detection module 415, a mode management module 416, a dispatcher 417, a rendering engine 418, a write control unit 419, an AV playback library 420, a network interface 421, a local storage 422, a managed copy control unit 423, a removable medium 104, and the recordable-type BD drive 106.

The BD drive 401 loads/ejects the BD-ROM onto and from the playback device, and accesses the BD-ROM.

The read control unit 402 controls the reading of data stored on the BD-ROM 105 loaded in the BD-ROM drive 401, the BD-R/RE loaded in the recordable-type BD drive 106, the local storage 422, and the removable medium 104.

The demultiplexer 403 demultiplexes the multiplexed transport stream read by the read control unit 402 to obtain video frames and audio frames which compose GOPs. The demultiplexer 403 then outputs the video frames to the video decoder 404 and outputs the audio frames to the audio decoder 406. The sub-video stream is stored in the image memory 407, while navigation button (Navigation Button) information is stored in the dynamic scenario memory 412. The multiplexing of the demultiplexer 403 also includes conversion processing for converting TS packets into PES packets.

The video decoder 404 decodes the video frames output from the demultiplexer 403 to write the resultant uncompressed picture into the video plane 405.

The video plane 405 is a memory for storing the uncompressed picture.

The audio decoder 406 decodes the audio frames output from the demultiplexer 403 to output uncompressed data.

The image memory 407 is a buffer for storing the sub-video stream read by the demultiplexer 403, the PNG data included in the Navigation Button information, and an image file that has been directly read by the read control unit 402.

The image plane 408 is a memory with a memory space of a screen size. In the image plane 408, the developed sub-video stream, PNG data, and image file are located.

The image decoder 409 develops the sub-video stream, PNG data, and image file stored in the image memory 407 and then writes the developed sub-video stream, PNG data, and image file to the image plane 408. As a result of the decoding of the sub-video stream, various menu items and sub-videos are presented on the screen.

The adder 410 synthesizes the uncompressed picture data stored in the picture plane 405 and the images developed in the image plane 408 and outputs the synthesized image data. The scene shown in FIG. 4B (i.e. the scene in which the CG, namely the owl animation in the figure, is moving about by the screen on which the video is being displayed) is output by an image in the image plane 408 and a picture in the video plane 405 being synthesized by the adder 410.

The static scenario memory 411 is a memory for storing a current PlayList and current stream management information. The current PlayList refers to one of the PlayLists recorded on the BD-ROM that is currently processed. The current stream management information is one of the stream management information pieces recorded on the BD-ROM that is currently processed.

The dynamic scenario memory 412 is a memory that stores the current dynamic scenario that is to be processed by the HDMV module 413 and the BD-J module 414. The current dynamic scenario is one of the scenarios recorded on the BD-ROM that is currently processed.

The HDMV module 413 is the DVD virtual player that functions as the fundamental component of the HDMV mode operation. The HDMV module 413 executes the current scenario program read out to the dynamic scenario memory 412.

The BD-J module 414 is a Java platform and is composed of a Java virtual machine, configuration, and profile. The BD-J module 414 generates a current Java object from a Java class file read out to the dynamic scenario memory 412, and executes the generated current Java object. The Java virtual machine converts a Java object written in the Java language into the native code for the CPU of the playback device and causes the CPU to execute the object.

The UO detection module 415 detects a user operation made onto a remote control, a front panel of the playback device, and such, and notifies the mode management module 416 of information (referred to below as a UO or User Operation) indicating the detected user operation.

The mode management module 416 holds a mode management table which has been read from the BD-ROM and performs mode management and branch control. The mode management by the mode management module 416 is an assignment to a module, namely, assigning the execution of the dynamic scenario to the HDMV module 413 or the BD-J module 414.

The dispatcher 417 selects one or more UOs appropriate for the current mode of the playback device among a plurality of UOs, and passes the selected UOs to the module that supports the current mode. For example, upon receiving UOs, such as upward, downward, leftward, and rightward, and activate operations, during the execution of the HDMV mode, the dispatcher 147 outputs these UOs to the module that supports the HDMV mode.

The rendering engine 418 has basic software, such as Java 2D and OPEN-GL. The rendering engine 418 renders computer graphics in accordance with instructions from the BD-J module 414 and outputs the rendered computer graphics to the image plane 408.

The write control unit 419 writes data into one of the media loaded in the recordable-type BD drive 106, the local storage 422, and the removable medium 104, in accordance with instructions from the managed copy control unit 423.

The AV playback library 420 performs functions of playing back the AV and playing back the PlayList, in accordance with a function call from the HDMV module 413 and BD-J module 414. The AV playback function is a series of functionality taken on from DVD and CD players. Examples of the function includes playback start, playback stop, pause, release of pause, release of a still picture function, fast forward with the playback rate specified by an immediate value, rewind with the playback rate specified by an immediate value, switching of audio, switching of sub-videos, and switching of angles. The PlayList playback function is to perform the playback start and stop processing in accordance with the PlayList information, among the above-described AV playback functions.

The network interface 421 is used for connecting to the server in order to perform authentication of the managed copy. As for the authentication protocol, the protocol designated by the Java application executed by the BD-J module is used.

The local storage 422, the removable medium 104, and the recordable-type BD drive 106 are used for copy destinations to which the managed copy is made. The user selects one copy destination medium from among the media supported as the copy destinations of the managed copy.

The managed copy control unit 423 copies the data on the BD-ROM, in response to instructions from the Java application executed by the BD-J module. Depending on the selected copy destination medium, the managed copy control unit 423 also re-encodes the stream. For example, if the copy destination medium is the BD-R, then the managed copy control unit 423 performs a bit by bit copy, whereas if the copy destination medium is a medium with a small capacity, such as a DVD-R, then the managed copy control unit 423 re-encodes the stream to copy the data while compressing the stream.

This concludes the description of the constituent components of the playback device.

Figure 6:
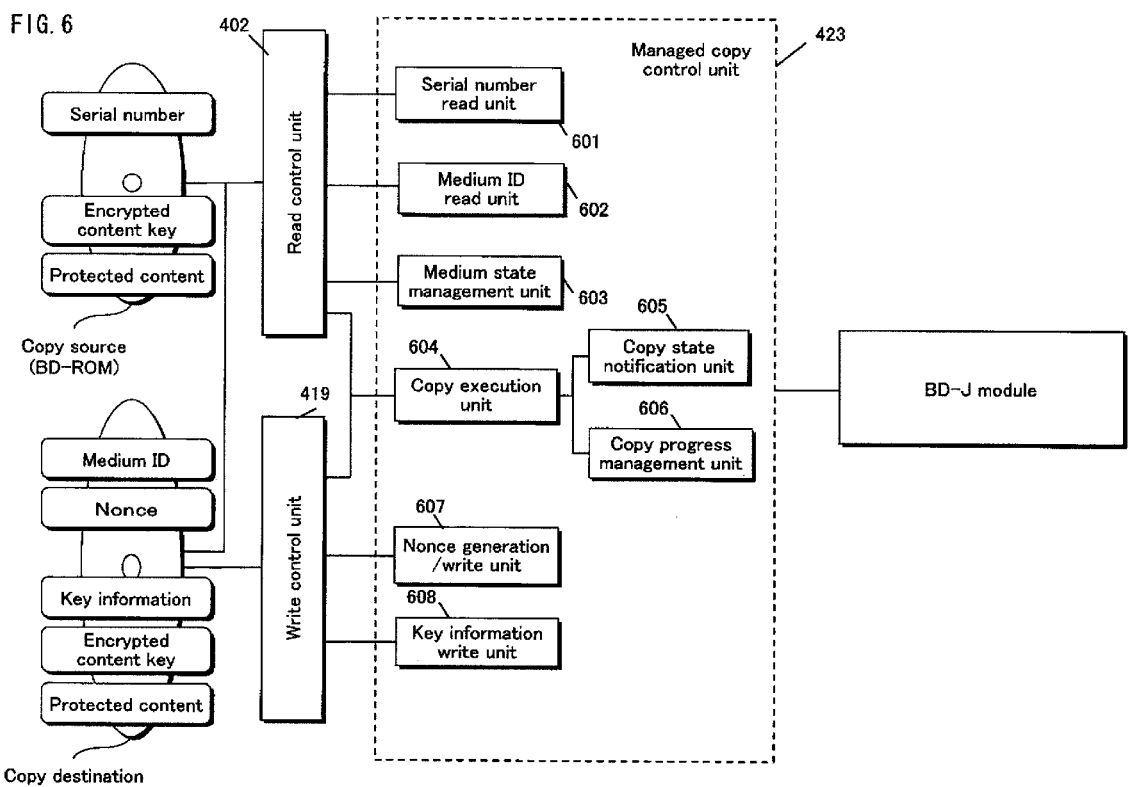
FIG. 6 shows an internal structure of a managed copy control unit in the first embodiment.

FIG. 6 is a detailed view of the managed copy control unit 423. The managed copy control unit 423 includes a serial number read unit 601, a medium ID read unit 602, a medium state control unit 603, a copy execution unit 604, a copy state notification unit 605, a copy progress management unit 606, a nonce (Nonce) generation/write unit 607, and a key information write unit 608.

The serial number read unit 601 reads the PMSN (Prerecorded Media Serial Number) indicating the physical serial number of the recording medium from the BCA (Burst Cutting Area) which is a special area provided on the BD-ROM. The serial number is used in generating the later-described key information.

The medium ID read unit 602 reads medium-specific information (medium ID) that is stored in each copy destination medium as the information uniquely provided for the medium. Generally, it is not possible to rewrite the information value, and even media of the same type are assigned with different values on a medium basis. The medium ID is also used in generating the key information.

The medium state management unit 603 manages a list of types of medium that are currently available for the playback device to use as the copy destination. For example, if the playback device has an SD card slot and a recordable-type BD drive, and only an SD card is currently inserted, then the medium state management unit 603 determines that the SD card is the current copy destination. If both the SD card and the BD-R are inserted, then the medium state management unit 603 determines that both the SD card and BD-R can be selected as the current copy destination. Besides, the medium state management unit 603 manages the free space of the copy destination medium.

The copy execution unit 604 performs copy of the data recorded on the BD-ROM to another medium. Depending on the copy destination medium, the copy execution unit 604 also re-encodes the stream.

The copy state notification unit 605 manages state transitions of the copy processing, such as the start, normal termination, and error, and notifies the Java application of the state transitions via the BD-J module.

The copy progress management unit 606 manages the byte count of data that remains to be copied as well as the byte count of data that has been copied, and notifies the current progress information in response to a request from the Java application.

The Nonce generation/write unit 607 generates and writes a value (Nonce) that is generated randomly everytime the managed copy is performed. The Nonce value is also used in generating the later-described key information.

The key information write unit 608 writes the serial number of the BD-ROM, the ID of the copy destination medium, and the key information generated from the Nonce. The generation of the key information is based on a secret key located on the server. After acquiring the serial number, the medium ID, and the Nonce, the Java application sends these values to the server. The server generates the key information based on the values received from the Java application and the secret key managed on the server and sends the generated key information back to the Java application. The Java application sets the key information received from the server into the key information write unit 608. The key information write unit 608 writes the set key information to the copy destination medium. The key information is used in decoding the encrypted content key. If the encrypted content key is decoded successfully, the protected content may be played back. In other words, without the key information, the protected content cannot be played back even if the encrypted content key and the protected content are copied from the BD-ROM without authorization.

The managed copy control unit has the above-described structures. Managed copy control APIs are provided to the BD-J module so as to control the above processes of the managed copy control unit through the Java application. The following is the description of the APIs.

ManagedCopy_getPMSN( )

By calling this API, the serial number of a copy source medium from which copy is made is returned.

ManagedCopy_getMCMediaInfo( )

By calling this API, a list of media is returned that are (i) supported by the playback device as the copy destination and (ii) currently available for use as the copy destination since the media are inserted.

ManagedCopy_startMC(MCMediaInfo)

By calling this API, the managed copy is started to one of the media specified by a parameter.

MCMediaInfo_getMediaType( )

By calling this API with respect to each medium listed in the copy destination list obtained by calling getMCMediaInfo, the medium type (e.g. a BD-R, a BD-RE, an SD, a HDD, and a DVD-R) is returned.

MCMediaInfo_getUniqueId( )

By calling this API, the medium ID and Nonce byte sequence of the copy destination medium are returned. As soon as this API is called, the Nonce of the copy destination is generated and written. The Nonce sometimes does not exist depending on the medium type. In such a case, only the medium ID is returned.

MCMediaInfo_setSignature(byte[ ])

By calling this API, the key information to be written to the copy destination is set. Once the managed copy is started, the value set by calling this API is written to the copy destination as the key information.

MCMediaInfo_getFreeSpace( )

By calling this API, the capacity of the free space in the copy destination is returned.

MCMediaInfo_getRequiredSpace( )

By calling this API, the capacity that is required for the copy is returned.

MCMediaInfo_addMCListener(MCListener)

By calling this API, the listener for receiving a notification of the state transitions of the managed copy processing is registered. Upon every change in the state of the managed copy processing, such as the start, normal termination, and abnormal termination, the state transitions are notified to the listener registered by calling this API.

MCProgress_getMCProgress( )

By calling this API, the progress information including the byte count of data that remains to be copied and the byte count of data that has been copied is returned.

Figure 7:
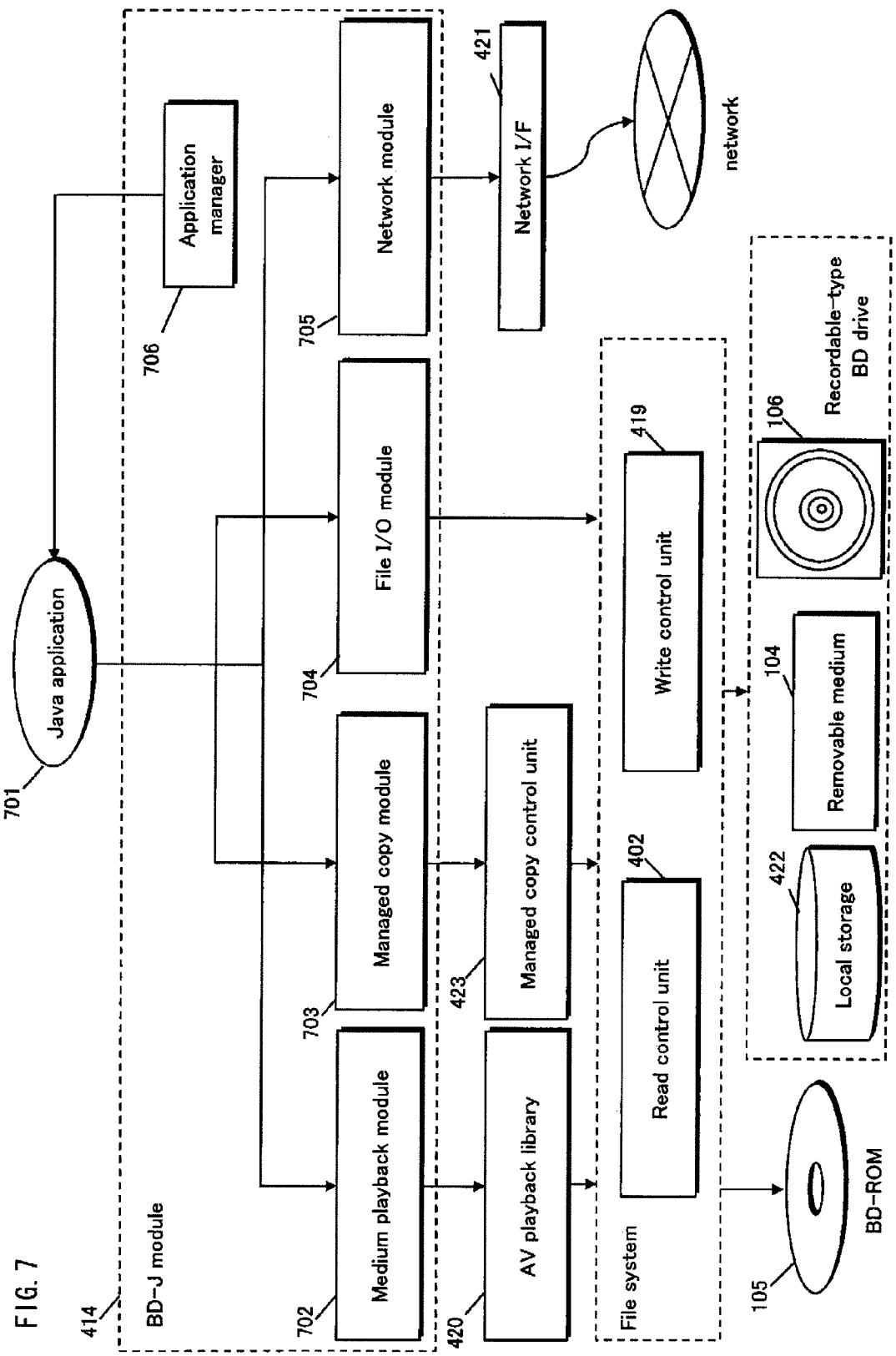
FIG. 7 shows a detailed structure of a BD-J module in the first embodiment.

FIG. 7 shows the structure of the BD-J module of FIG. 5 in further details. The BD-J module 414 includes a medium playback module 702, a managed copy module 703, a file I/O module 704, a network module 705, and an application manager 706.

The medium playback module 702 provides the Java application 701 with an API for controlling the medium playback. Once the Java application 701 calls the medium playback control API, the medium playback module calls a function in the AV playback library 420 that corresponds to the called API to control the AV playback.

The managed copy module 703 provides the Java application 701 with the above-mentioned APIs for controlling the managed copy.

The file I/O module 704 processes a file access request sent from the Java application 701 to any of such media as the BD-ROM, the local storage, the removable medium, and the recordable-type BD drive.

The network module 705 provides the Java application 701 with an API for controlling the network. In response to a network control request from the Java application 701, the network module 705 establishes a network connection using the network interface 421. The Java application 701 is capable of accessing the server required for authentication of the managed copy, with use of the network module 705.

The application manager 706 manages the activation/termination of the Java application based on the application management information recorded on the BD-ROM. The application manager 706 also performs other processing, such as passing the UO event, which has been received by the application manager from the dispatcher 417, to the Java application 701 that is currently operated.

This concludes the description of the constituent components of the BD-J module.

Figure 8:
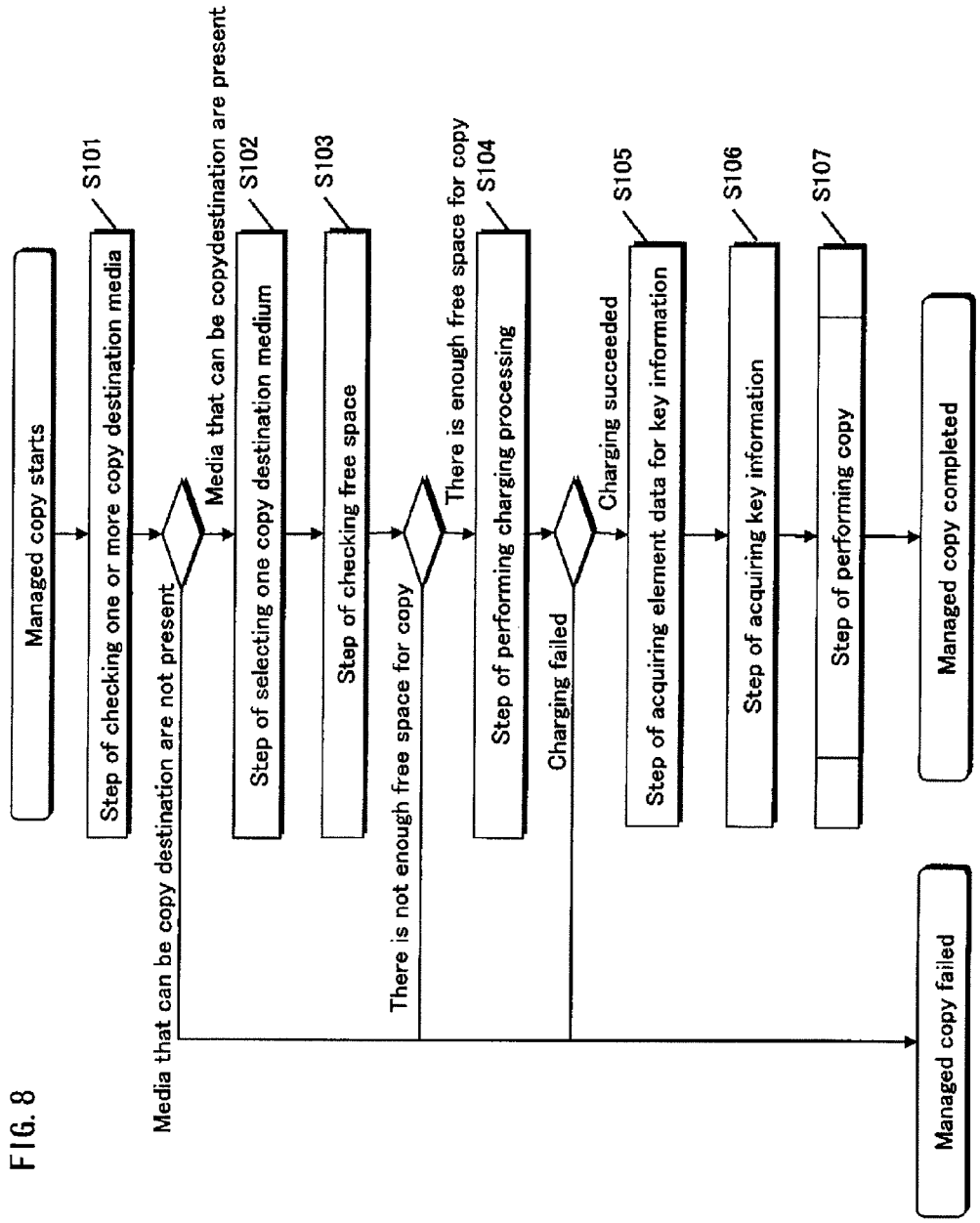
FIG. 8 is a flowchart of managed copy in the first embodiment.
Figure 9:
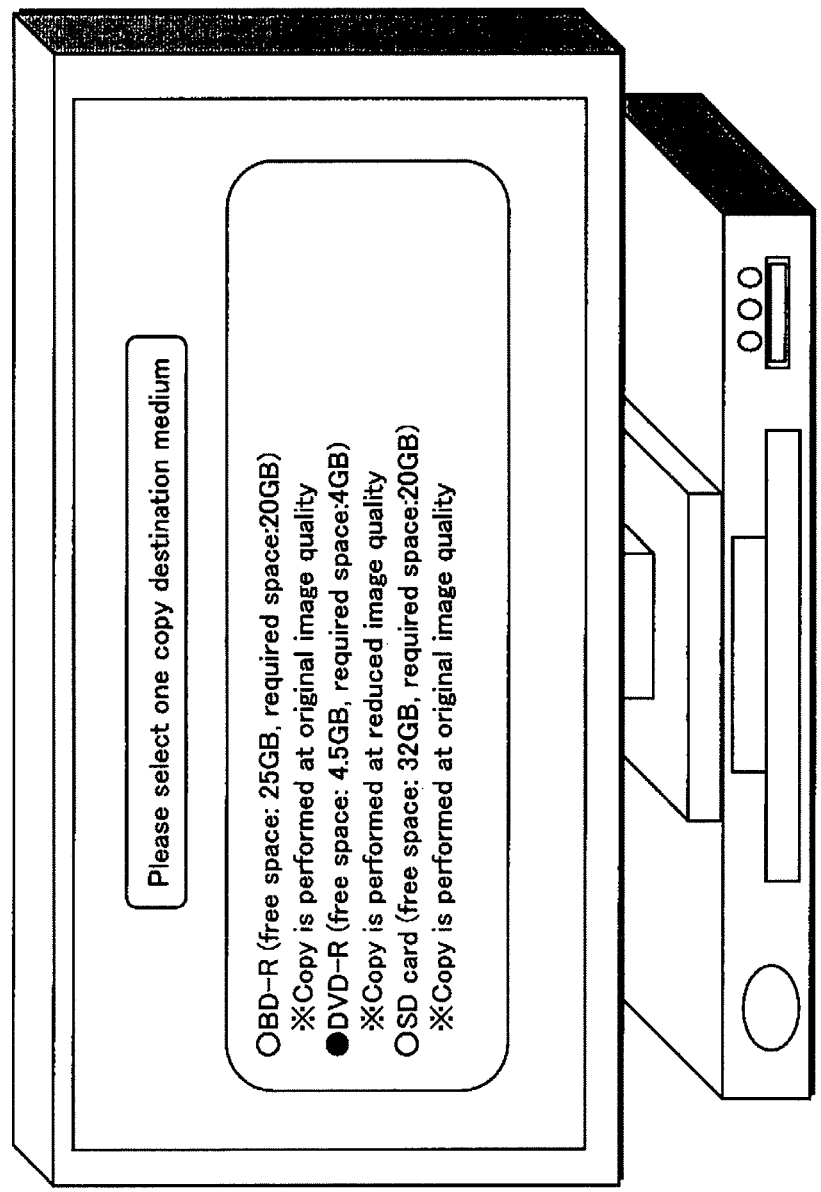
FIG. 9 shows an example of a screen on which a copy destination medium can be selected in the first embodiment.

FIG. 8 is a flowchart showing the managed copy control performed by the Java application. Firstly, the Java application calls ManagedCopy_getMCMediaInfo( ) to check whether one or more media to which the copy can be made are present (S101). If the one or more media that can be selected as the copy destination are present, one copy destination medium is selected from among them (S102). The selection is made either by the Java application itself or by the user to whom the list of selectable copy destination media is presented. FIG. 9 shows an example regarding the case where the list of the media to which the copy can be made is presented to the user. In addition to the names of the media, the capacities of the free space in the respective media may also be presented. This is done by checking the capacities of the free space through MCMediaInfo_getFreeSpace( ). Further, the value indicating the capacity required for the copy may also be presented, by calculating the capacity from the size of the copy source file. The capacity required in the copy destination medium may be calculated either by the Java application itself or by the playback device based on the file list to be copied. In the case where the stream is compressed again and stored, in particular, the file size inevitably changes. In this case, it is effective for the playback device to calculate the required capacity. The required capacity calculated by the playback device may be acquired through MCMediaInfo_getRequiredSpace( ).

The Java application then checks the capacity of the free space in the selected copy destination medium (S103), and if it is checked that there is enough free space for the copy, performs a charging processing procedure (S104). The charging processing procedure herein refers to a series of processes for connecting to the server and performing authentication of, for example, a credit card number. This step may be skipped if the charging is not particularly required. Also, merely the copy count may be checked instead of the charging.

If the charging processing ends successfully, the Java application acquires element data for the key information (S105). The element data for the key information indicates the following two items. One is the serial number of the copy source medium. The other is the medium ID and the Nonce of the copy destination medium. The serial number of the copy source medium may be obtained through ManagedCopy_getPMSN( ), and the medium ID and the Nonce of the copy destination may be obtained through medium MCMediaInfo_getUniqueId( ).

Once the acquisition of the element data for the key information is completed, the Java application sends the acquired element data to the server. The server generates the key information using the received element data and the secret key held by the server, and sends the generated key information back to the Java application. The Java application sets the received key information to the playback device as the parameter of MCMediaInfo_setSignature(byte[ ]) (S106).

Figure 10:
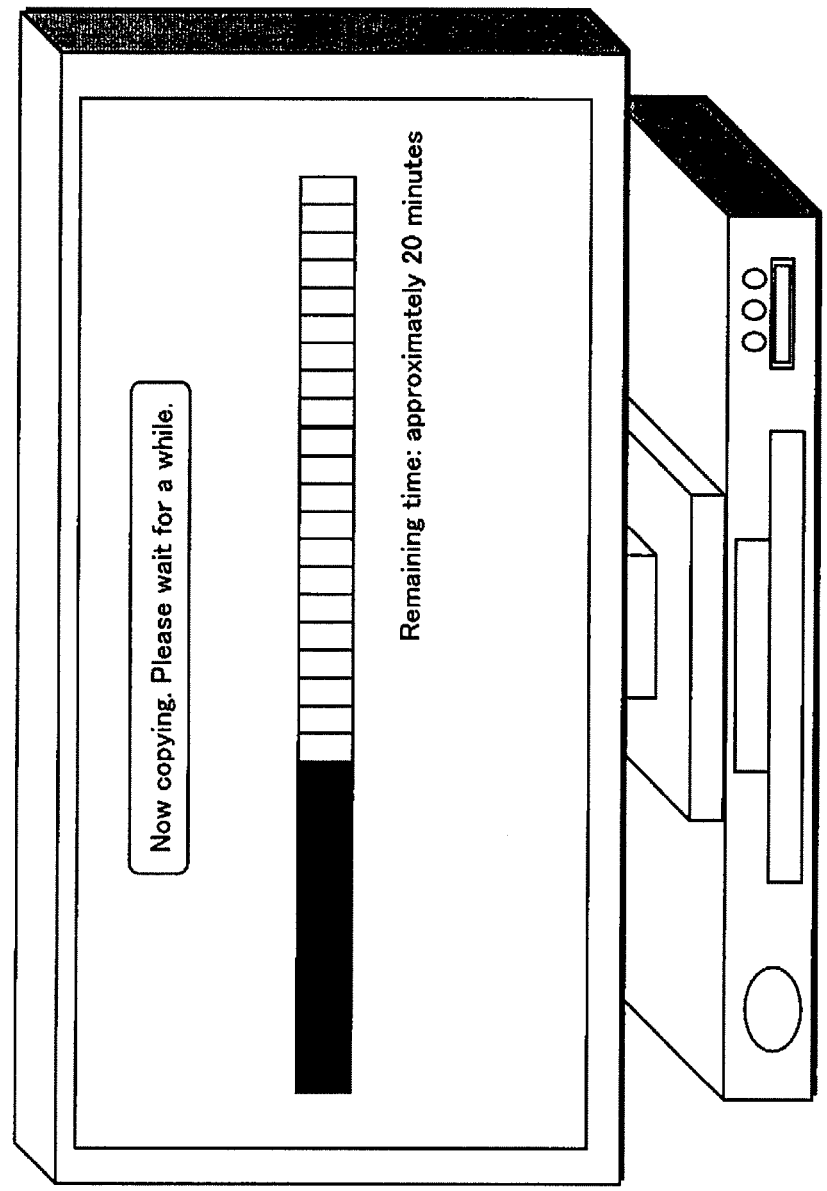
FIG. 10 shows an example of a displayed screen during the managed copy in the first embodiment.

Once the setting of the key information is completed, calling the API of ManagedCopy_startMC(MCMediaInfo) starts the managed copy. While the managed copy is performed, the Java application is able to recognize the progress of the copy by calling MCProgress_getMCProgress( ). FIG. 10 shows an example in which the progress of the copy is displayed on the screen. Since the Java application is able to recognize the byte count of data that remains to be copied and the byte count of data that has been copied, it is possible to roughly determine the remaining copy time from the byte count. Further, by calling MCMediaInfo_addMCListener(MCListener) to register the listener for receiving a notification of the state transitions of the managed copy processing, the Java application is able to receive the notification of copy start/end. By this means, the Java application is able to display a progress bar or an advertisement of a new movie until the notification of copy end is received. Instead of the display, a simple game application may also be executed. Moreover, the notification is also received in the case where the copy fails. Accordingly, even if the copy fails due to a forced ejection of the medium and the like, the Java application is able to receive the notification of copy failure and then cope with the situation by canceling the charging processing, for example.

Figure 11:
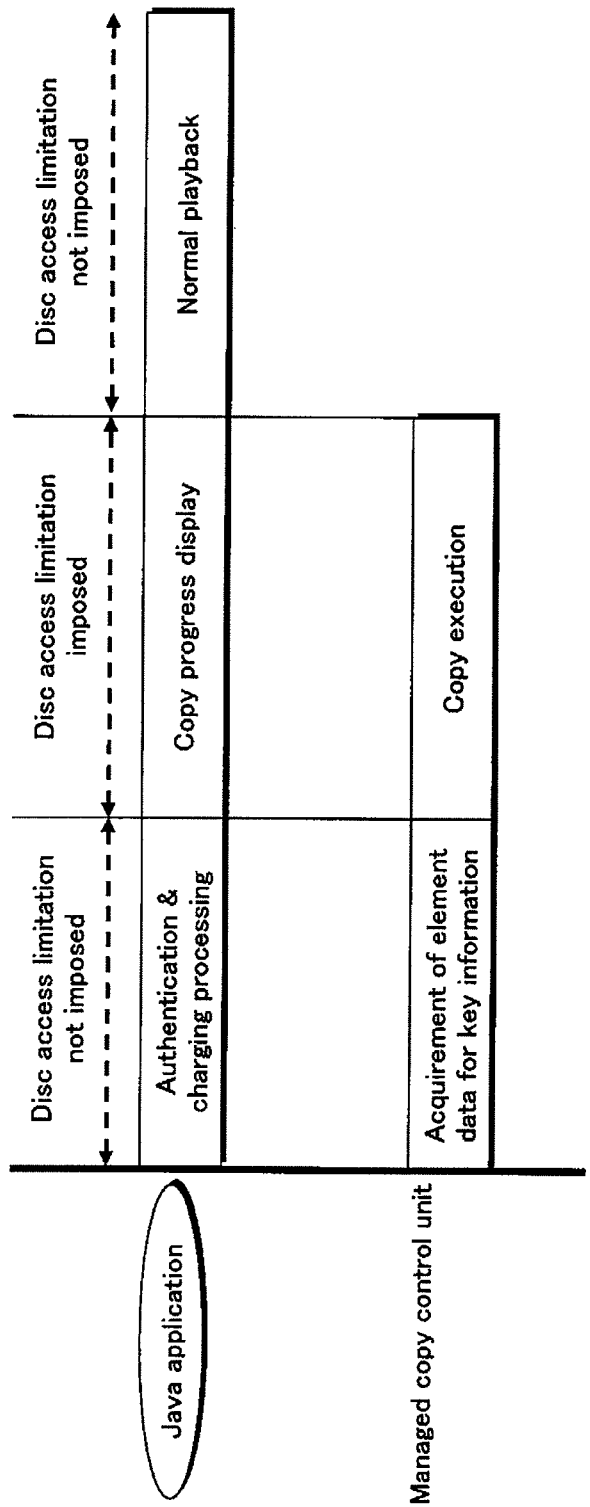
FIG. 11 shows the start/end of disc access control in the first embodiment.
Figure 12:
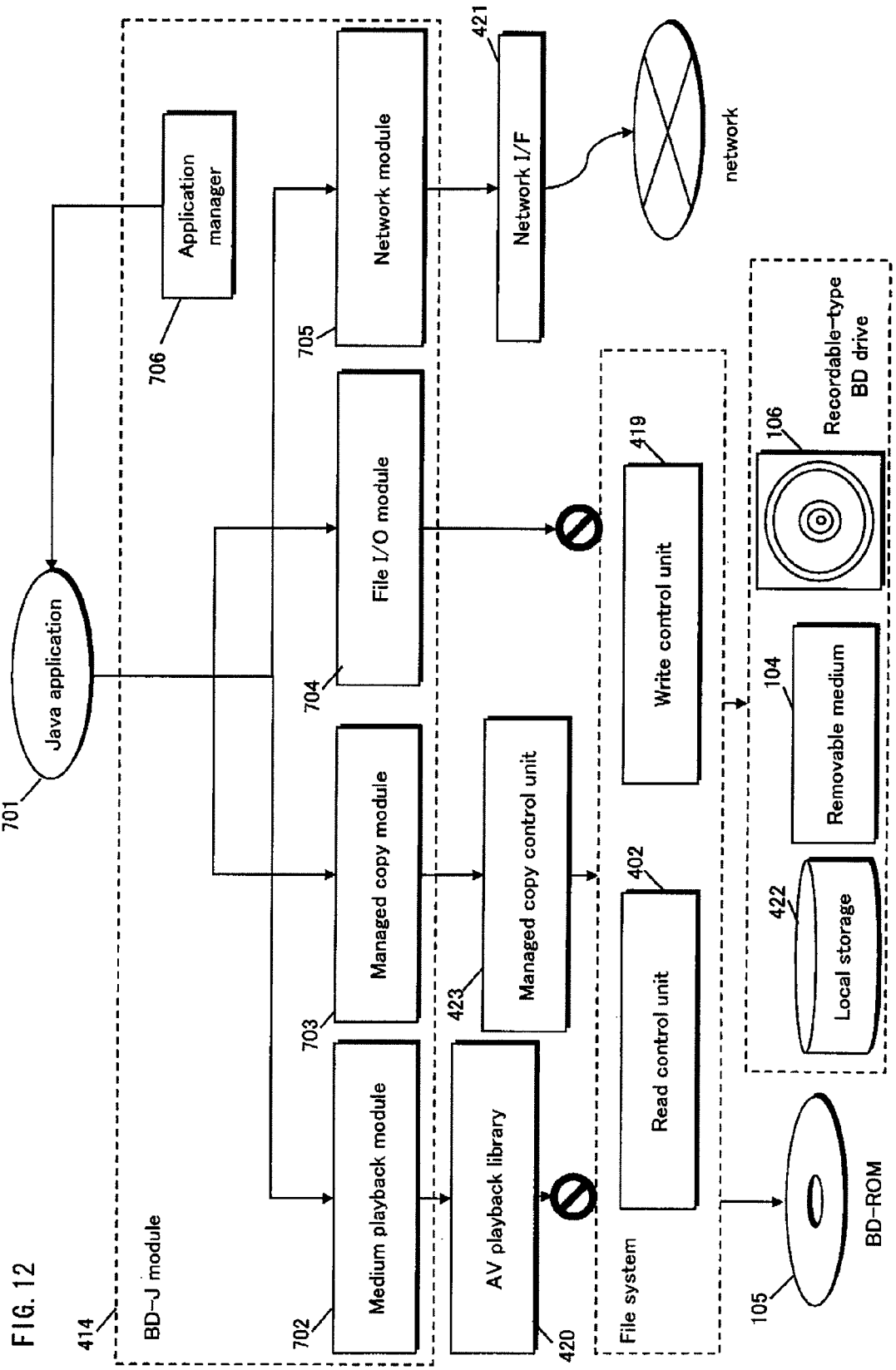
FIG. 12 shows the internal structure of the BD-J module during the disc access control in the first embodiment.

FIG. 11 shows a disc access limitation while the copy is performed. Prior to the copy operations by the managed copy control unit, the Java application is able to play back the stream by calling the medium playback module 702 and to access a file on the BD-ROM by calling the file I/O module 704. On the other hand, once the copy operations by the managed copy control unit start, limitations are imposed on the playback of the stream requested from the medium playback module 702 and the file access requested from the file I/O module 704. There are two reasons why these limitations are imposed. One is to prevent the failure of the copy due to the shortage in resources as a result of a collision between the managed copy control unit, and the file I/O processing and the decode processing of the Java application. The other is to enable the managed copy control unit to exclusively utilize the file system, decoder, encoder, and others. For these purposes, while the copy is performed, a limitation is imposed on the Java application so that the disc is virtually ejected. However, even in the state where the disc is virtually ejected and therefore the disc access is disabled, the server connection using image data on the cache memory and the network I/F is still executable. This is why the simple game may be executed and PR/advertisements may be displayed. The above limitation is lifted as soon as the copy by the managed copy control unit is completed. That is to say, the Java application is able to acknowledge not only the start/end of the copy but also the start/end of the disc access limitation, by calling MCMediaInfo_addMCListener(MCListener) to register the listener for receiving a notification of the state transitions of the managed copy processing. Meantime, the Java application determines that the disc is virtually ejected/inserted on each start/end of the copy. When the copy is performed, a notification of disc ejection may also be issued together with the notification of copy start so as to notify the Java application clearly of the ejection of the disc. Similarly, when the copy is completed, a notification of disc insertion may also be issued together with the notification of copy end.

Figure 13:
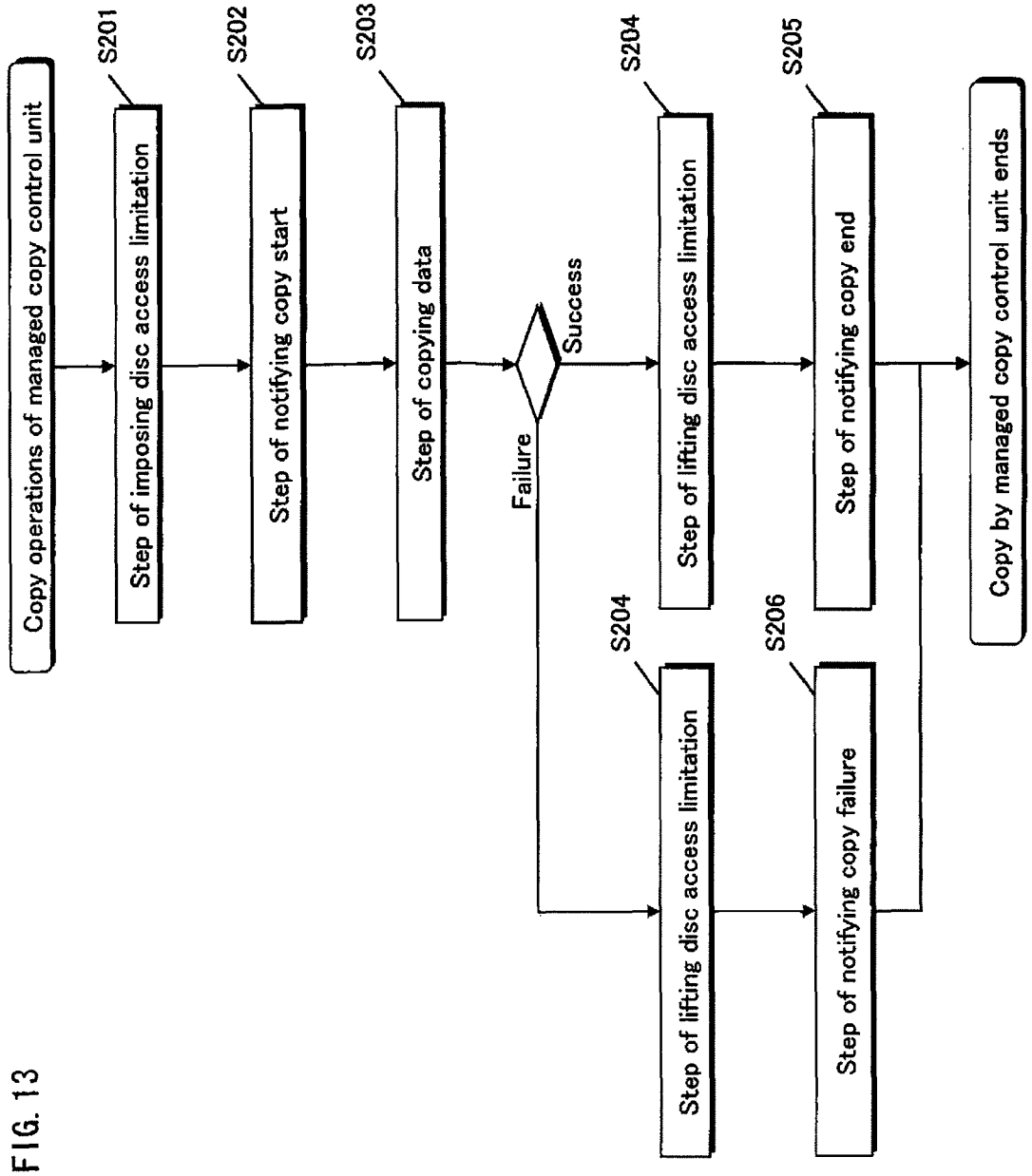
FIG. 13 is a flowchart of the copy execution performed by the managed copy control unit in the first embodiment.

FIG. 13 is a flowchart showing the copy operations of the managed copy control unit. This flowchart shows the step S107 of FIG. 8 in further details. Before the managed copy control unit actually performs the copy, a limitation is imposed on the disc access from the Java application (S201). Subsequent to the imposition of the disc access limitation, the copy start is notified to the Java application (S202). Subsequent to the notification of copy start, data copy from the copy source to the copy destination is started. Once all the data to be copied has been copied, the disc access limitation performed in step S201 is lifted (S204), and the copy end is notified to the Java application (S205) to end the copy processing in the managed copy control unit. In the case where the copy in Step S203 fails before completion of the copy, the disc access limitation is lifted, and then copy failure is notified to the Java application.

As mentioned above, the present embodiment makes it possible to execute the managed copy and the Java application simultaneously while preventing the resource contention. This also makes it possible to display the progress of the managed copy, display a PR/advertisement, and execute a game application and such during the copy.

Second Embodiment

The second embodiment describes the managed copy that is made on a removable medium with a limitation with respect to the recordable file names. Files recorded on a BD-ROM adopt the Long File Name (LFN) format. Accordingly, file names of ten and twenty characters, and file names with extensions of four and five characters may be used on the BD-ROM. On the other hand, removable media often utilize a file system in which a file name length is limited to eight characters at most, a directory name length is limited to eight characters at most, and an extension length is limited to three characters at most. For this reason, some file names recorded on the BD-ROM cannot be copied as-is to the removable medium.

Figure 14:
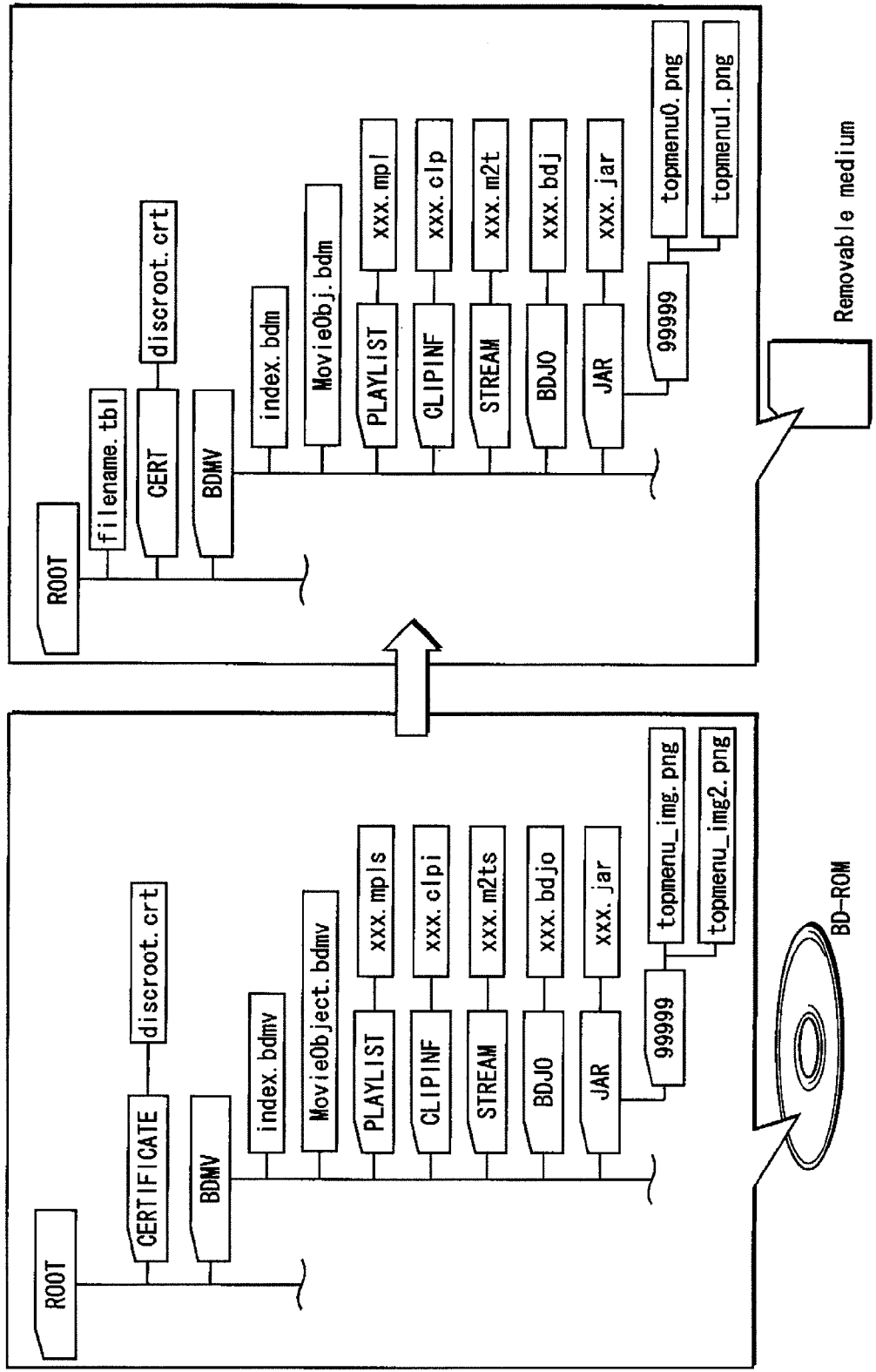
FIG. 14 shows the managed copy in which the file name limitation of a removable medium is taken into consideration in the second embodiment.

FIG. 14 shows the managed copy in which the file name limitation of the removable medium is taken into consideration. A description is given of the case where the files having names nine characters long or longer, or files with extensions four characters long or longer are copied from the BD-ROM into the removable medium. The file names are converted before being stored, so that the length of the file names is eight characters or smaller, or so that the length of the extensions is equal to or smaller than the characters normally playable. If a converted file name overlaps with another file name that has been already converted, sequential numbers are assigned to those file names. Accordingly, such an overlap is addressed. Besides, regarding the files whose file names have been converted and stored, the original file names before the conversion are also stored in one-to-one correspondence with the converted file names after the conversion, in a file name conversion table (filename.tbl). FIG. 15 shows an example of the file name conversion table.

Before the playback of a removable medium, presence of the file name conversion table is determined. If it is determined that the file name conversion table is stored, and an access to one of the unconverted file names listed in the file name conversion table is detected, the read control unit 402 replaces the original file name with the corresponding converted file name in order to access to the file on the removable medium.

As mentioned above, the file names converted in the managed copy processing are stored in the file name conversion table, and the virtual file accesses is made using the unconverted file names with reference to the file name conversion table at the time of the playback. By these means, the files that have been copied through the managed copy to the recording medium having the file name limitation may be played back without any problem.

Supplement to First Embodiment

A description is given below in order to supplement each constituent component included in the playback device described in the first embodiment. The playback device according to the first embodiment is capable of copying and thus so-called a recording/playback device.

It is general that installed (i.e. not portable) playback devices have a recording function, along with a playback function. With the recording function, the playback device is able to convert data and encoding formats (these conversions are called transcoding) to execute the managed copy. The following describes a configuration example in which the recording/playback device is additionally provide with some constituent components for the transcoding.

FIG. 16 shows a general internal structure of the recording/playback device to which the constituent components for the transcoding are added. As shown in the figure, the playback device includes an HDMI transmission/reception unit 501, a signal input unit 502, an audio encoder 503, a video encoder 504, and a multiplexer 505.

The term transcoding mentioned above refers to processing for adjusting digital streams to an application format used in the copy destination medium. The adjustment is performed, for example, by converting the format of the digital streams recorded on the BD-ROM from an MPEG-2 transport stream format to an MPEG-2 program stream format, or by re-encoding the video and audio streams after lowering the bit rates allocated for the streams.

A path tc0 is used to make a bit by bit copy for copying the bit streams recorded on the BD-ROM to another recording medium while maintaining the bit pattern. Through the path tc0, a video stream read by the read control unit 402 is input directly to the write control unit 419.

A path tc1 is used to re-multiplex the video and audio streams that have been multiplexed and stored on the BD-ROM.

Paths tc2 and tc3 are used to re-encode the video and audio streams.

The HDMI transmission/reception unit 501 transmits uncompressed video data and uncompressed audio data to the television 103 and receives data from the television 103.

The signal input unit 502 receives an analog signal input to the playback device 101.

The audio encoder 503 encodes the analog signal input from the signal input unit 502 to obtain the audio stream. In the case where the transcoding is performed, the audio encoder 503 re-encodes the uncompressed audio data input through the path tc2.

The video encoder 504 encodes the analog signal input from the signal input unit 502 to obtain the video stream. In the case where the transcoding is performed, the video encoder 504 re-encodes the uncompressed video data input through the path tc3.

The multiplexer 505 multiplexes the video stream obtained by the video encoder 504 and the audio stream obtained by the audio encoder 503 into a format suitable in the copy destination medium, such as the transport stream format and the program stream format.

This concludes the description of the internal structure of the recording/playback device. A description is next given of a technical significance of the BD-J module.

General Structure of BD-J Module

The BD-J module is a Java platform fully provided with Java 2 Micro_Edition (J2ME), Personal Basis Profile (PBP 1.0), and Globally Executable MHP specification (GEM1.0.2) for package media targets. The BD-J module serves to start the Java application, by reading a byte code from a class file present in the Java archive files and storing the read byte code to a heap memory. The BDJ-module also converts the byte code of the Java application and the byte code of the system application to native codes so that an MPU can execute the Java application and the system application. These functions of the BD-J module are shown more clearly in FIG. 17.

Figure 17:
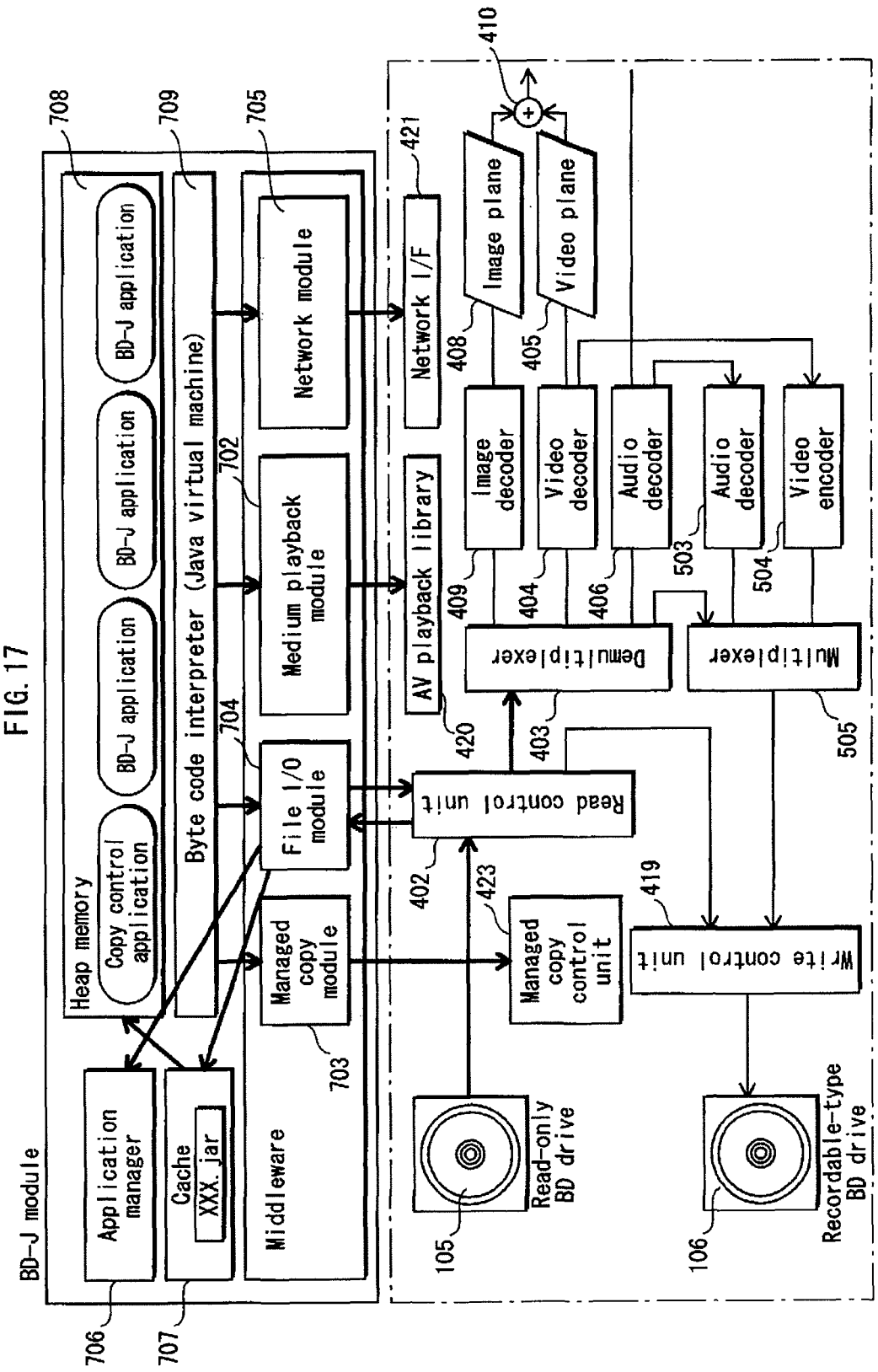
FIG. 17 shows the internal structure of the BD-J module, clearly showing the general constituent elements.

FIG. 17 shows the internal structure of the BD-J module, clearly showing the general constituent elements. A description is given of the technical significances of the file I/O module 704 and the medium playback module 702 in conjunction with the figure.

In FIG. 17, the Java application is present in the heap memory of the BD-J module. Note that, in the BD-ROM, the operation of the Java application is defined by the application management table in the BD-J object. Since there is one BD-J object per Title, the Java application on the BD-ROM operates with the Title as the life cycle. This sort of Java application whose operation is bound by the application management table in the BD-J object is called a "BD-J application". On the other hand, the Java application whose operation is terminated by switching of the Title is called a title boundary application. Furthermore, the application whose operation is always terminated by exchange of the BD-ROM is called a disc boundary application.

In the heap memory shown in the figure, BD-J applications are stored, one of which is the BD-J application (copy control BD-J application) that performs copy control using the APIs as mentioned above. The copy control BD-J application specifies the operation mode of the BD-J application, upon instructing the managed copy control unit 423 to control the copy. There are the following three operation modes: the first mode for terminating the current BD-J application in operation and leaving the managed copy to the control of the resident program of the playback device; the second mode for not terminating the BD-J application; and the third mode for executing the BD-J application while limiting the functions of the application, by achieving a state where a request from the executed application is rejected. In the case where the copy control BD-J application specifies the third mode upon instructing the managed copy to the copy control unit 423, the processing of the first embodiment is performed.

A description is given of an operation that triggers the state transition of the file I/O module 704 to the state where the module 704 rejects a playback request from the BD-J application.

The playback device adopts Linux operation system or the like, and assigns the BDMV directory to the BD-ROM drive 105 by issuing the command "/mount point BD/BDMV". By issuing the command "/mount point SD/BUDA", the BUDA directory is assigned to the removable medium 104. By such a mounting operation, the read-only BD, the local storage, and the recording BD are assigned to the virtual file system to be used by the BD-J application. By executing the operation to cancel the mounting operation, that is, unmounting operation, the BD-J application is disabled to acknowledge the read-only BD, the local storage, and the recording BD through the virtual file system. Thus, the state where a request from the BD-J application is rejected is achieved.

A description is given of the operation that triggers the state transition of the medium playback module 702 to the state where the module 702 rejects the playback request from the BD-J application. The playback of the PlayList is executed by the BD-J application generating a Java Media FrameWork (JMF) player instance. This generation is performed by the medium playback module 702 creating the JMF player instance upon being instructed to generate the JMF player instance specifying the PlayList information file. On the other hand, in spite of an instruction to generate the JMF player instance given by the BD-J application, if the medium playback module 702 returns an error without generating the JMF player instance of the PlayList information file, the request from the BD-J application cannot be approved. Accordingly, if the medium playback module 702 is in the state of rejecting the playback request form the BD-J application, the medium playback module 702 does not generate the JMF player instance even when receiving the request from the BD-J application.

A description is given of the usage of MCMediaInfo_addMCListener by the file I/O module 704 and the medium playback module 702.

In order to achieve the state transitions of the file I/O module 704 and the medium playback module 702 to the state where the respective modules reject a request from the BD-J application at the start of the managed copy, it is necessary for the file I/O module 704 and the medium playback module 702 to call MCMediaInfo_AddMCListener (MCListener) to register therein the listeners for receiving notifications of the state transitions of the managed copy processing. By doing so, the start of the managed copy by the managed copy control unit is notified to the respective event listeners registered in the file I/O module 704 and the medium playback module 702. When the start of the managed copy is notified to the event listener, the file I/O module 704 and the medium playback module 702 make the transitions to the state where the respective modules reject a request from the BD-J application. Then, upon receiving a file access request or a JMF player instance generation request from the BD-J application, the file I/O module 704 and the medium playback module 702 return an error response to these requests. This prevents the contention between the managed copy control unit and the BD-J application for BD-ROM access or the like. On the other hand, at the time of normal termination or abnormal termination, such a termination is notified to the file I/O module 704 and the medium playback module 702. This causes the state transitions of the I/O module 704 and the medium playback module 702 from the above state to the normal state. In this normal state, upon receiving a file access request or a JMF player instance generation request form the BD-J application, the file I/O module 704 and the medium playback module 702 perform processing in response to the request.

The above description provides only an implementation example of software which allows the state transitions of the file I/O module 704 and the medium playback module 702 to the state where the respective modules reject a request from the BD-J application. The file I/O module 704 and the medium playback module 702 themselves may also sense whether the managed copy has been performed, when receiving the disc access request or the playback request form the BD-J application. By doing so, the file I/O module 704 and the medium playback module 702 may make the transitions to the state where the respective modules reject a request from the BD-J application.

Thus, in the state where the file I/O module 704 and the medium playback module 702 reject the playback request from the BD-J application, the BD-J application is not able to access the read-only BD, the local storage, and the recording BD. However, the BD-J application is still able to utilize the data in a cache 707.

The cache 707 is a cache memory for storing an archive file that is specified by cache management information of the BD-J object corresponding to one current Title. The archive file stored in the cache 707 is effective during the time when the one Title is currently processed. The BD-J application is able to utilize a program and data included in the archive file in the cache 707 without accessing the BD-ROM or the local storage. This means that the BD-J application is able to utilize the data included in the archive file even if the BD-ROM is ejected.

Figure 18:
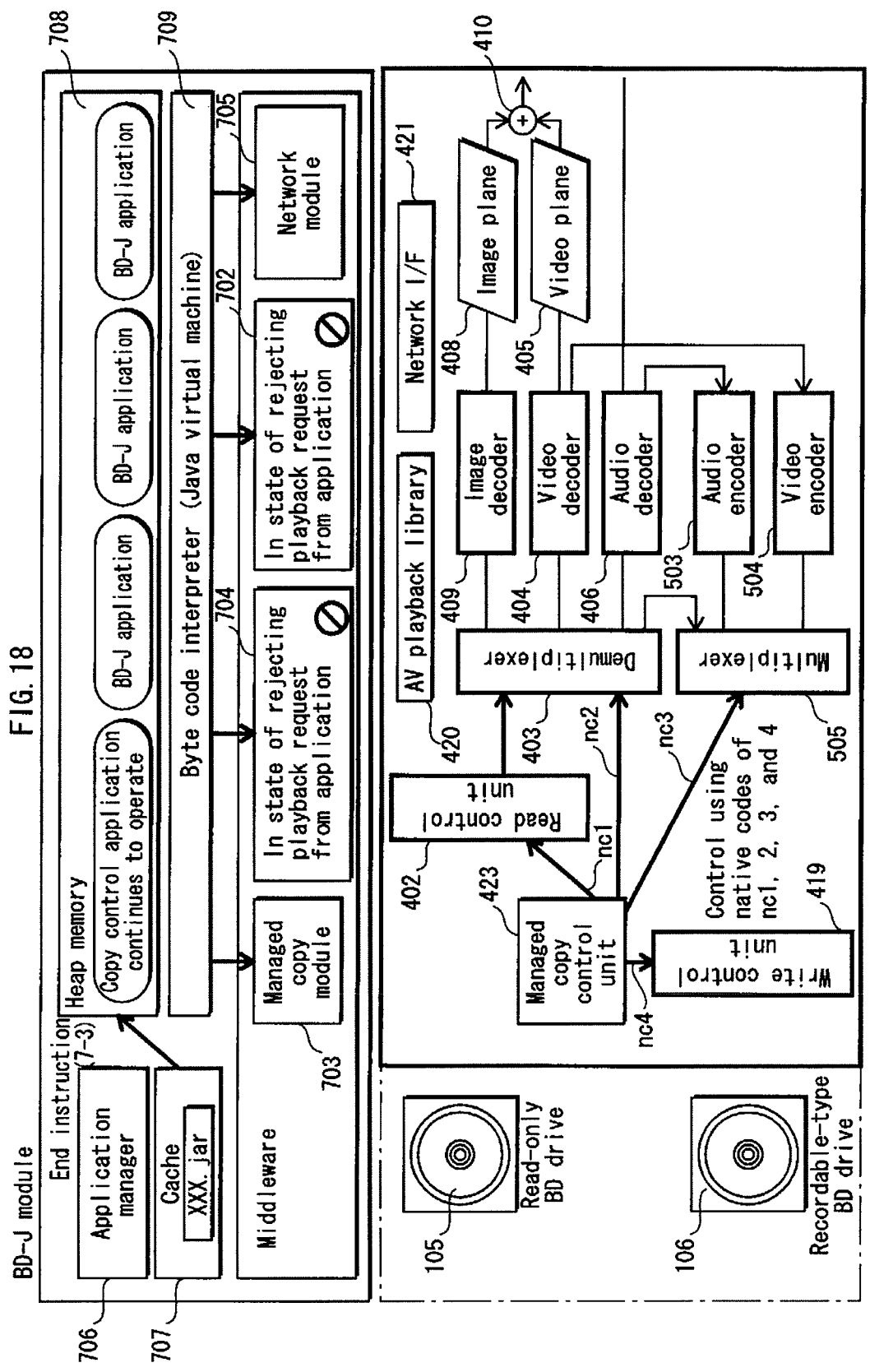
FIG. 18 shows a state where a request from the BD-J application is rejected.

FIG. 18 shows the state where a request from the BD-J application is rejected. In this state, the file I/O module 704 and the medium playback module 702 reject the playback request from the BD-J application. The BD-J application, which is supposed to instruct the read control unit 402, the demultiplexer 403, the multiplexer 505, and the write control unit 419 to perform playback processing through the medium playback module 702 and the file I/O module 704, is not able to instruct the playback processing anymore. This prevents the contention between the BD-J application and the copy execution unit 604 for utilization of the resources.

Figure 19:
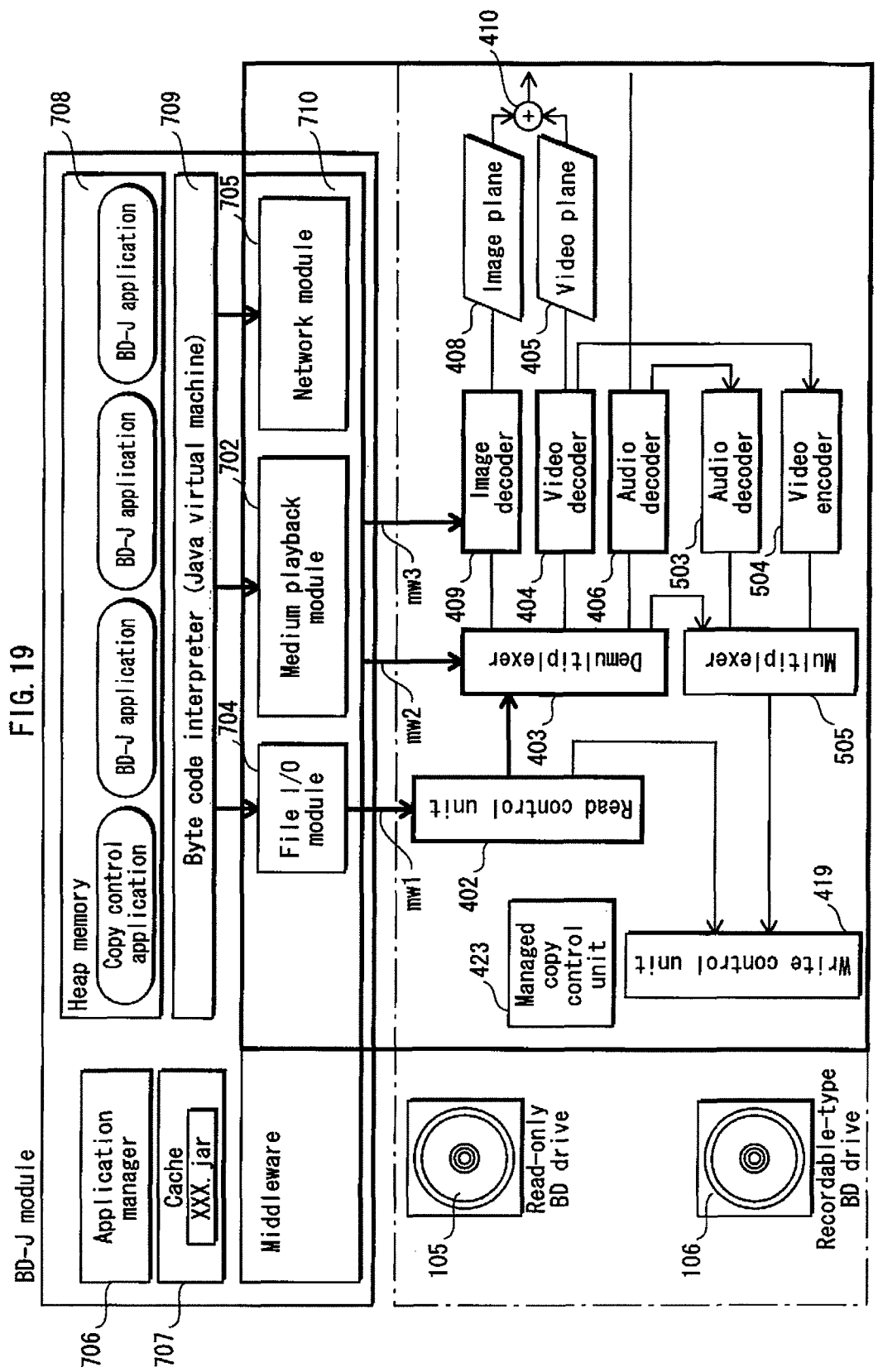
FIG. 19 shows the normal state following the state where a request from the BD-J application is rejected.

FIG. 19 shows the normal state following the state where a request from the BD-J application is rejected. In the normal state, the medium playback module 702 and the file I/O module 704 respond to the playback request from the BD-J application, and the BD-J application is now able to request the playback processing. This concludes the description of the technical significances of the file I/O module 704 and the medium playback module 702. Subsequently, a description is given in details of the API call from the BD-J application.

State Transitions of BD-J Application Over Time

During the execution of the managed copy, the medium playback module 702 and the file I/O module 704 accept a processing request from the BD-J application. In accordance with this, the states of the title boundary application and the copy control application each go through the transitions as shown in FIG. 20.

Figure 20:
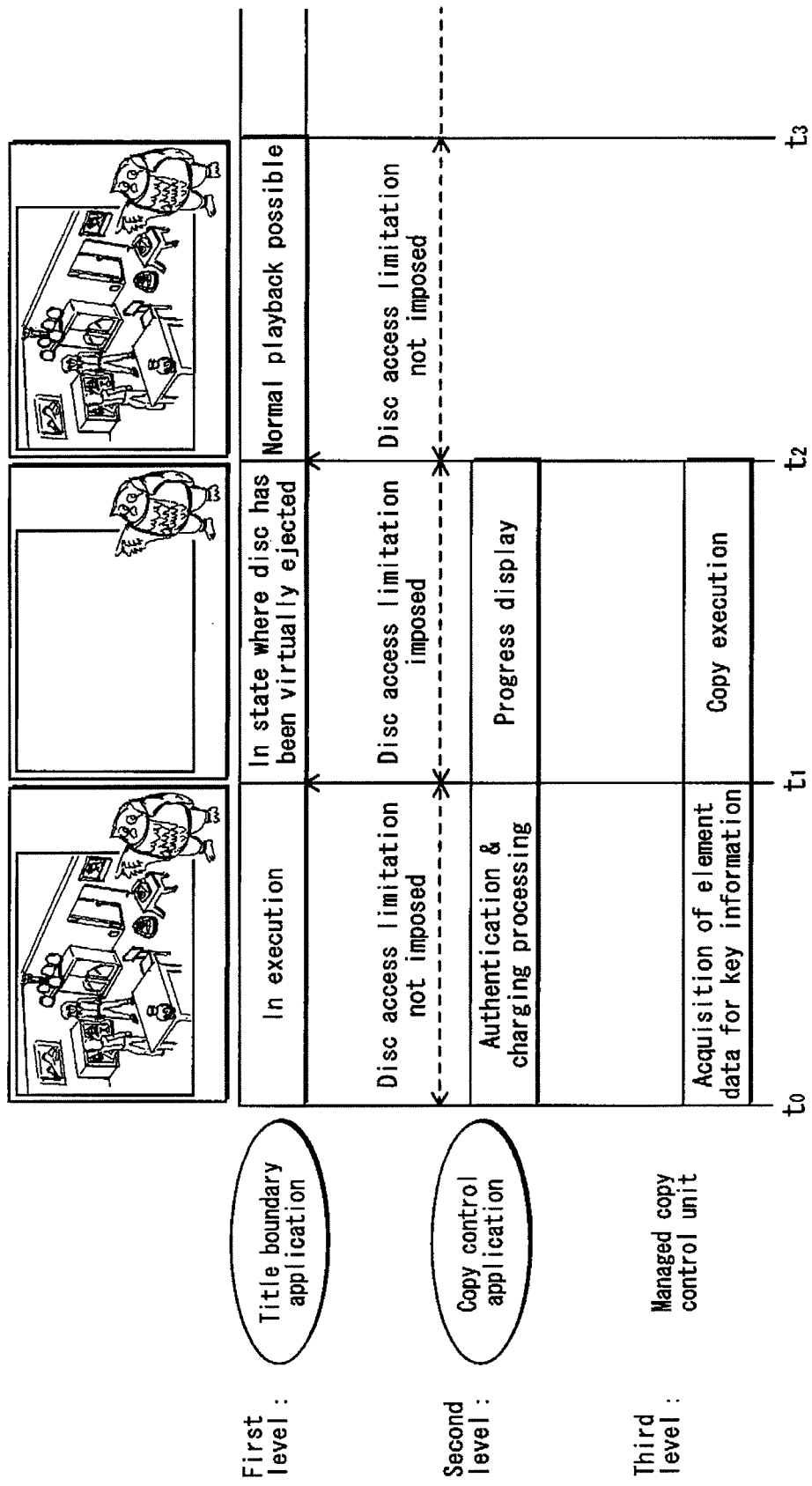
FIG. 20 shows transitions of the processing performed by the title boundary application, the copy control application, and the managed copy control unit at the time of or around the managed copy over time.

FIG. 20 shows the transitions of the processing performed by the title boundary application, the copy control application, and the managed copy control unit at the time of or around the managed copy over time. The first level from the top indicates the processing performed by the title boundary application whose life cycle is bound by the Title. The second level indicates the processing performed by the copy control application. The third level indicates the processing performed by the managed copy control unit 423. The title boundary application is executed in the time period (t0-t1) in which the authentication and charging processing is performed. On the other hand, in the time period (t1-t2) in which the copy is executed, video images of an AV stream cannot be played back. Accordingly, the title boundary application merely renders the CG character stored in the cache. Then, in the time period (t2-t3) after the copy has terminated, the title boundary application returns to the normal playback state, and renders the CG character while playing back the AV stream video images. Thus, the BD-J application is able to render the character using the CG data in the cache even while the managed copy is executed. This enables the author in charge to make use of the copy time so that the user does not get bored.

This concludes the description of the state transitions of the title boundary application and the copy control application over time.

API Used for Copy Control

Since the copy control in this specification is BD-J application driven control, the BD-J application programming interfaces (APIs) must be used to describe the processing of the managed copy control unit. A description is given below of the APIs used for the copy control.

Figure 21:
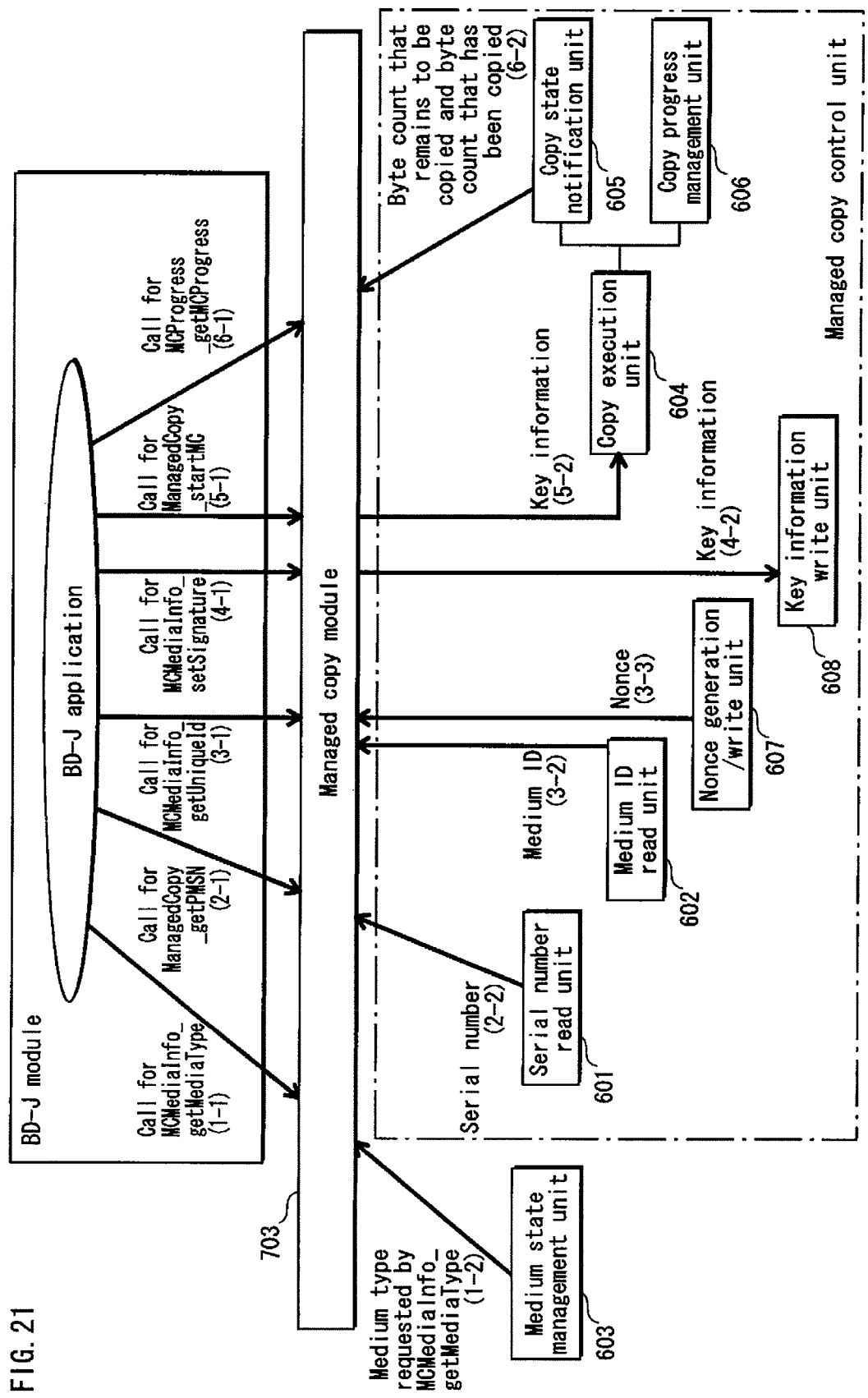
FIG. 21 shows various API calls from the BD-J application and the resultant processing details in one-to-one correspondence.

FIG. 21 shows various API calls from the BD-J application and the corresponding processing details in one-to-one correspondence.

The arrow (1-1) schematically indicates the call for MCMediaInfo_getMediaType made by the BD-J application.

The arrow (1-2) schematically indicates that the medium state control unit 603 notifies the medium type in response to the call.

The arrow (2-1) schematically indicates the call for ManagedCopy_getPMSN made by the BD-J application. The arrow (2-2) schematically indicates that the serial number read unit 601 returns the serial number in response to the call.

The arrow (3-1) indicates the call for MCMediaInfo_getUniqueId made by the BD-J application. The arrow (3-2) schematically indicates that the medium ID read unit 602 returns the medium ID (Media-ID) in response to the call. The arrow (3-3) also schematically indicates that the Nonce generation/write unit 607 returns the Nonce in response to the call.

The arrow (4-1) schematically indicates the call for MCMediaInfo_setSignature made by the BD-J application. The arrow (4-2) schematically indicates that the key information write unit 608 writes the key information in response to the call.

The arrow (5-1) schematically indicates the call for ManagedCopy_startMC made by the BD-J application. The arrow (5-2) schematically indicates that the copy execution unit 604 returns the key information.

The arrow (6-1) schematically indicates the call for MCProgress_getMCProgress made by the BD-J application. The arrow (6-2) schematically indicates that the copy state notification unit 605 returns the byte count of data that remains to be copied, and also that the copy progress management unit 606 returns the byte count of data that has been copied.

This concludes the description of the API calls from the BD-J application and the corresponding processing details.

Details of Copy Execution Unit 604

The managed copy in the present specification is supposed to be applied to copy between different types of media and involves transcoding. Accordingly, in the managed copy, it is not suffice to sequentially copy bit streams recorded on the copy source BD-ROM from the innermost circumference to the outermost circumference. It is necessary to copy the files and directories present on the BD-ROM one by one. The processing procedure that involves such transcoding and is performed by the copy execution unit 604 is shown in FIG. 22.

Figure 22:
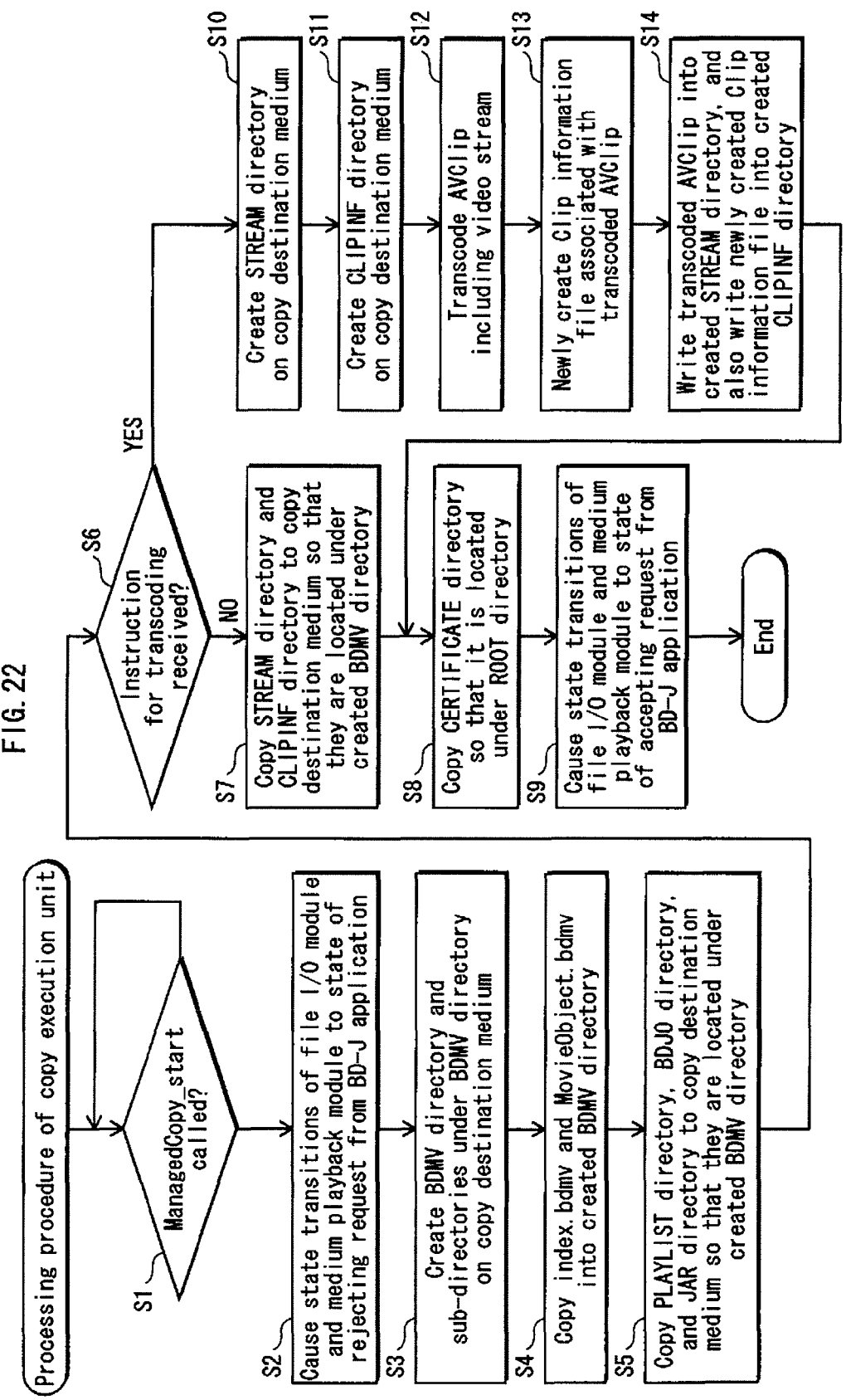
FIG. 22 is a flowchart showing a processing procedure of the copy execution unit 604.

FIG. 22 is a flowchart showing the processing procedure of the copy execution unit 604. In step S1, the copy execution unit 604 waits for the call for ManagedCopy_start. If ManagedCopy_start is called, the processing moves on to step S2. In step S2, the copy execution unit 604 causes state transitions of the medium playback module 702 and the file I/O module 704 to the state where the respective modules reject a request from the BD-J application.

In step S3, the copy execution unit 604 creates a BDMV directory on the copy destination medium. In step S4, the copy execution unit 604 copies the index.bdmv and MovieObject into the created BDMV directory. In step S5, the copy execution unit 604 copies the PLAYLIST directory, the BDJO directory, and the JAR directory to the copy destination medium so that they are located under the created BDMV directory. In step S6, it is determined whether an instruction for the transcoding is received. Without receiving the transcoding instruction, the processing moves on to step S7. In step S7, the copy execution unit 604 copies the STREAM directory and the CLIPINF directory to the copy destination medium so that they are located under the created BDMV directory. Subsequently in step S8, the copy execution unit 604 copies the CERTIFICATE directory located under the ROOT directory.

Upon receiving the transcoding instruction, the copy execution unit 604 creates a STREAM directory and a CLIPINF directory on the copy destination medium. Then in step S12, the copy execution unit 604 transcodes the AVClip including the video stream. In step S13, the copy execution unit 604 newly creates a Clip information file associated with the transcoded AVClip. The Clip information file is newly created in the transcoding because the Clip information file includes a lot of information determined by the stream, such as the packet numbers, the entry map indicating a relation of the stream and the presentation time stamps, and others.

In step S14, the copy execution unit 604 writes the transcoded AVClip into the created STREAM directory and also writes the newly created Clip information file into the created CLIPINF directory. Then, the processing moves on to the step S8.

In step S9 after the above copy processes, the copy execution unit 604 causes the state transitions of the medium playback module 702 and the file I/O module 704 to the state where they accept a request from the BD-J application.

This concludes the description of the processing procedure of the copy execution unit 604.

Details of BD-J Application Management

Figure 23:
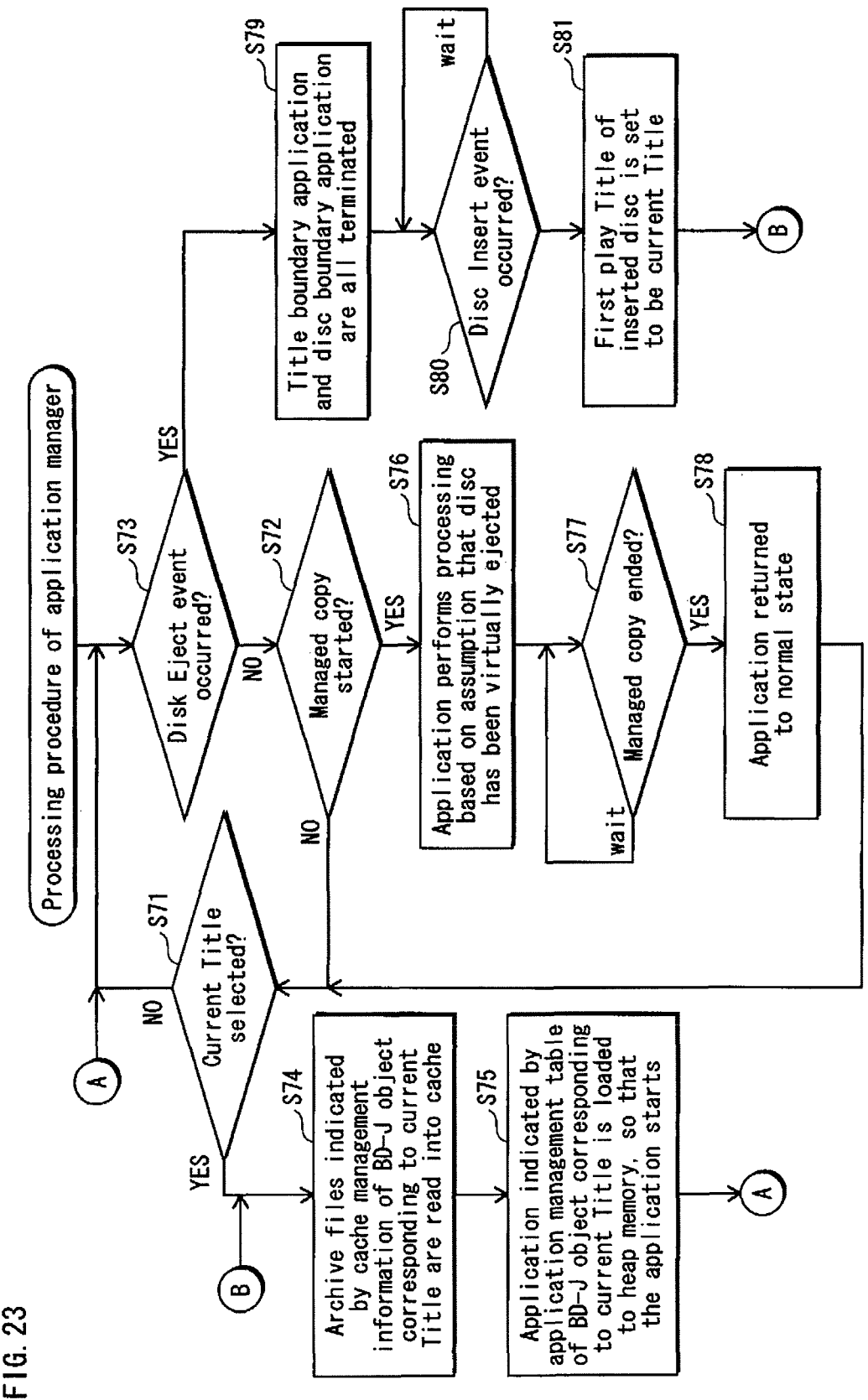
FIG. 23 is a flowchart showing the processing procedure of the BD-J application manager.

In the present invention, while the copy is executed, the medium playback module 702 and the file I/O module 704 are in the state of rejecting a request from the BD-J application, and causes the BD-J application to perform processing that is executable without using the BD-ROM. In this state, the BD-ROM is assumed to have been virtually ejected despite that the BD-ROM is actually loaded in the playback device. Accordingly, the management of the BD-J applications by the BD-J application manager according to the present invention is not conventional and is unique, as shown in FIG. 23. A description is given below of the processing procedure of the BD-J application manager in conjunction with FIG. 23.

FIG. 23 is a flowchart showing the processing procedure of the BD-J application manager. The flowchart has a loop structure in which steps S71 to S72 are repeated.

In step S71, it is determined whether a current Title is selected by the mode management module 416. If it is determined that the current Title is selected, steps S74 and S75 are performed, and the processing goes back to the loop of the steps 71 through S73. In step S74, the archive files indicated by cache management information of the BD-J object corresponding to the current Title are read into the cache. In step S75, the BD-J application indicated by the BD-J application management table of the BD-J object corresponding to the current Title is loaded to the heap memory, so that the BD-J application starts.

In step S72, it is determined whether the managed copy has started. If it is determined that the managed copy has started, the processing moves on to step S76. In the step S76, the BD-J application operates based on the assumption that the disc has been virtually ejected. In step S77, the BD-J application manager waits until the managed copy is completed. Once the manage copy is completed, the processing moves on to step S78. In the step S78, the BD-J application returns to the normal state. Then, the processing goes back to the steps S71 through S73.

If a disk eject (Disk Eject) event occurs in step S73, then, steps S79 through S81 are performed. In the step S79, the title boundary application, whose life cycle is bound by the Title, and the disc boundary application, whose life cycle is bound by the disc, are all terminated. In the step S80, the BD-J application manager waits until a disc insert (Disc Insert) event occurs. Once the Disc Insert event occurs, the processing moves on to step S81. In the step S81, the first play Title of the inserted disc is set to be the current Title, and then, the processing moves on to the step S74. As mentioned above, the flowchart shows that during the managed copy, a playback request from the BD-J application is rejected, while the BD-ROM is kept loaded in the playback device.

Descriptions of BD-J Application Using APIs

The APIs are used in the copy control performed by the BD-J application. Accordingly, like the copy control by the copy control application, the charging processing prior to the copy and the copy progress display must be performed with use of the APIs. A description is given below of the descriptions for the copy control, the charging processing, and the copy progress display.

Figure 25A:
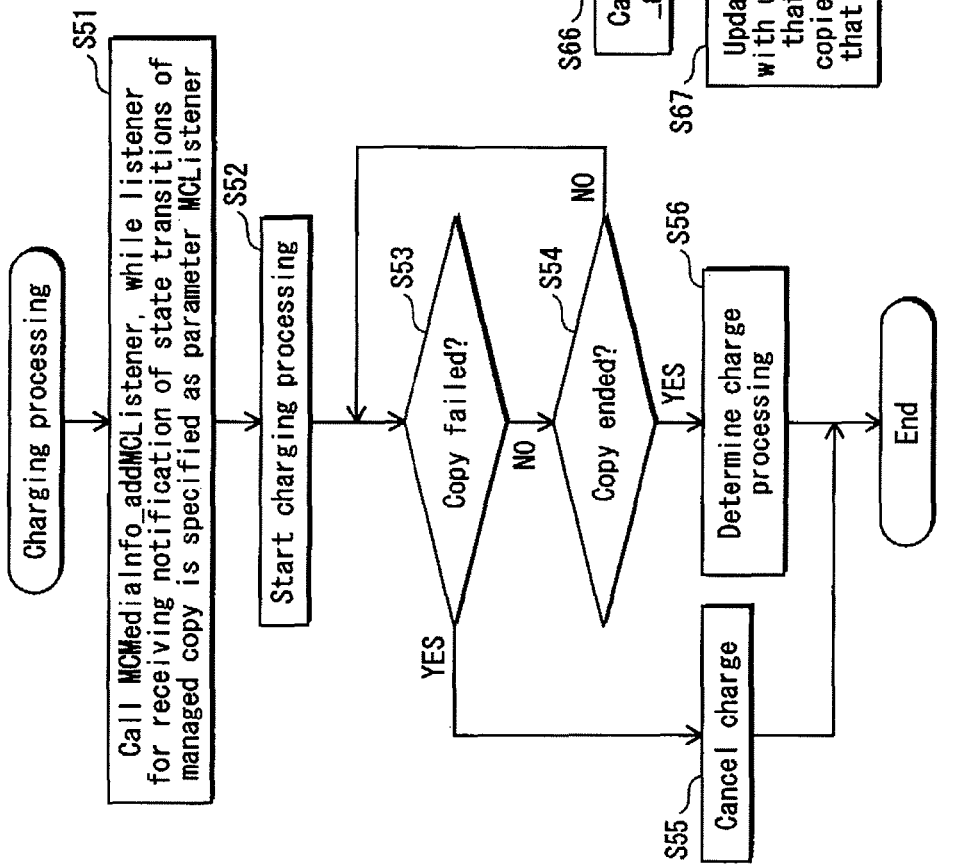
Figure 26:
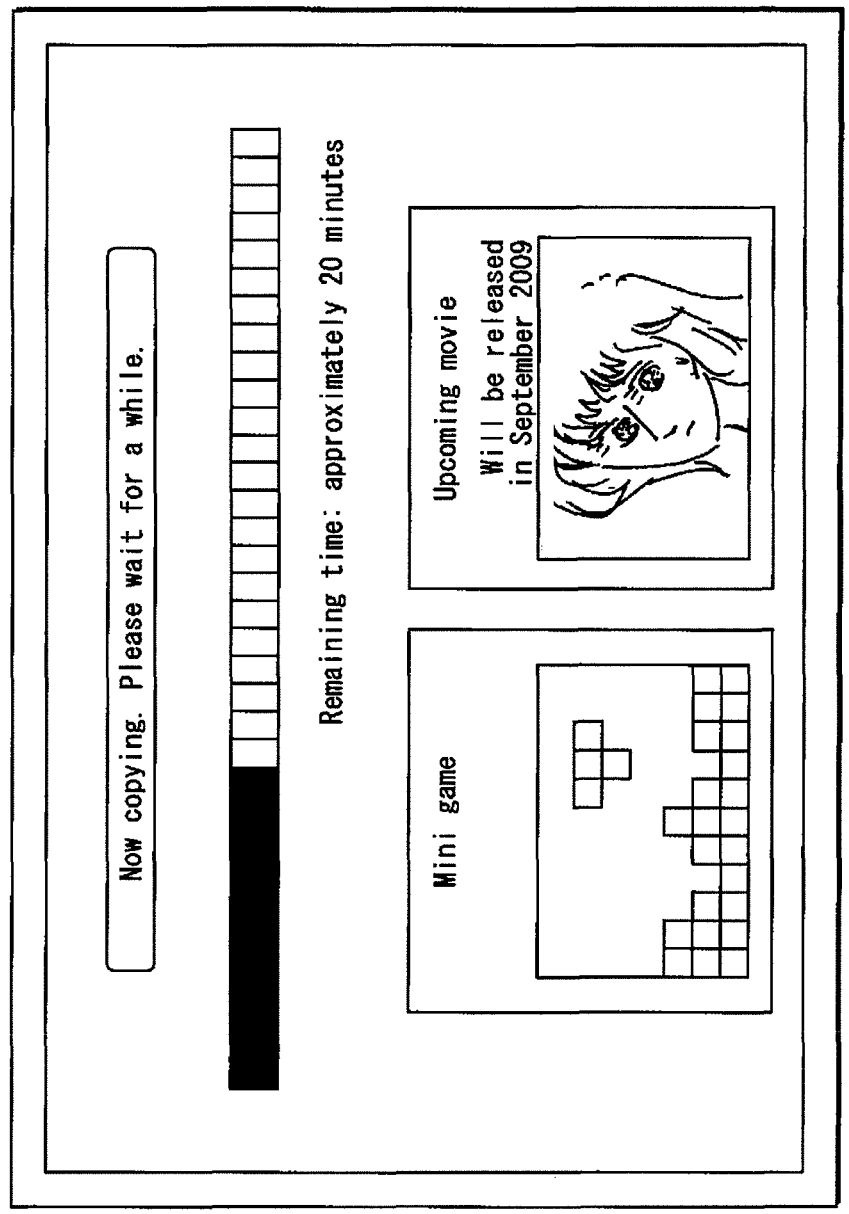
FIG. 26 shows an example of the copy progress display during which a mini game is executed and a trailer is presented.

FIG. 24 is a flowchart showing usage of the APIs in a processing procedure of the BD-J application performing the copy control. FIG. 25A is a flowchart showing the procedure of the charging processing using the APIs. FIG. 26 shows an example of the copy progress display during which a mini game is executed and a trailer is presented.

In step S21, the BD-J application calls ManagedCopy_getMCMediaInfo. In step S22, the BD-J application acquires a list of media that can be selected as the copy destination medium. After receiving the list of media, the BD-J application calls MCMediaInfo_getMediaType for each medium on the copy destination list (step S23) and acquires the type of each medium on the copy destination list (step S24).

In step S25, each medium on the copy destination list is displayed along with the medium type in order to prompt a user selection (step S26). Upon receiving the user selection, the BD-J application determines whether the copy destination medium ID is present (step S27). If it is determined that the medium ID is present, the BD-J application determines the selected copy destination medium (step S28). Then, the BD-J application calls MCMediaInfo_getFreeSpace to acquire the free space available in the copy destination medium (step S29). In step S30, the BD-J application determines whether the acquired free space is equal to or greater than free space A. If it is determined that the acquired free space is equal to or greater than the free space A (Yes in the step S30), the BD-J application calls MCMediaInfo_getRequiredSpace to acquire the capacity B that is required for the copy (step S31) and compares the free space A and the required capacity B (step S32). If there is not enough free space, the BD-J application calculates a compression ratio and instructs the transcoding during which the data is re-encoded (step S34). In step S33, the BD-J application starts the charging processing. If the charging processing is performed successfully (step S35), the BD-J application starts to display a progress bar (step S36). Subsequently, the BD-J application calls MCMediaInfo_getUniqueId with respect to the determined copy destination medium to acquire the medium ID and the Nonce of the copy destination medium (step S37). The BD-J application also calls ManagedCopy_getPMSN to acquire the serial number of the copy source medium (step S38). The serial number of the copy source medium, the medium ID, and the Nonce are transmitted to the administration server run by a provider of the copy source medium (step S39). The BD-J application then waits for the key information (step S40). Upon receiving the key information, the BD-J application sets the key information, by calling MCMediaInfo_setSignature while specifying the bite count of the key information as the parameter (step S41). Then, by calling ManagedCopy_startMC using MC MediaInfo as the parameter, the BD-J application starts the managed copy (step S42).

In step S51 of FIG. 25A, MCMediaInfo_addMCListener is called, while the listener for receiving a notification of the state transitions of the managed copy processing is specified as the parameter MCListener. In step S52, the charging processing is started. Subsequently, the processing moves on to a loop of steps S53 to S54. In the step S53, it is determined whether the copy has failed. If it is determined that the copy has failed, the charge is cancelled in step S55. In the step S54, it is determined whether the copy has been completed. If it is determined that the copy has been completed, the charging processing is confirmed.

Figure 25B:
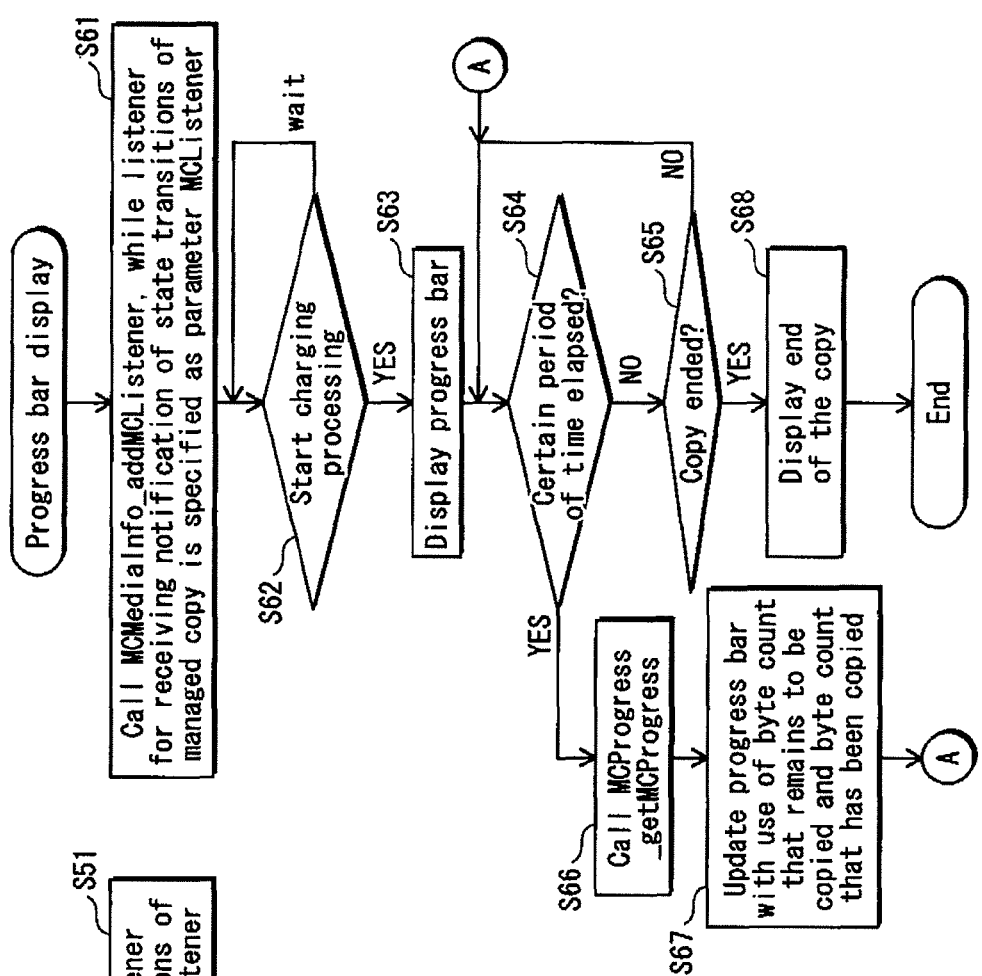
FIG. 25A and FIG. 25B are flowcharts showing a processing procedure of charging and progress bar display using the APIs.

FIG. 25B is a flowchart showing the processing procedure of the progress bar display. MCMediaInfo_addMCListener is called, while the listener for receiving a notification of the state transitions of the managed copy processing is specified as the parameter MCListener. Subsequently, in step S62, the BD-J application waits until the managed copy starts. If the managed copy starts, the progress bar is displayed. Then, the processing moves on to a loop of steps S64 to S65. In step S64, it is determined whether a certain period of time has elapsed. If it is determined that the certain period of time has elapsed, MCProgress_getMCProgress is called in step S66 to obtain the byte count of data that remains to be copied and the byte count of data that has been copied. In step S67, the progress bar is updated with use of thus obtained byte count of data that remains to be copied and the byte count of data that has been copied. In step S65, it is determined whether the copy has terminated. If it is determined that the copy has been completed, the completion of the copy is displayed in step S68.

FIG. 26 shows an example of the copy progress display during which a mini game is executed and a trailer is presented. The figure is based on FIG. 10 and additionally shows screens for executing the mini game and for presenting the trailer are added to the progress display of FIG. 10. The mini game and the trailer are presented using data that has been stored in the archive files of the copy control application. Accordingly, the data may be presented as shown in FIG. 26 by reading the data from the cache, even when the disc is assumed to have been ejected. These screens for executing the mini game and presenting the trailer help alleviate the user's feeling of boredom.

Other Modifications

Although the playback device of the present invention has been described according to the embodiments, it is naturally appreciated that the present invention is not limited to these embodiments.

The first embodiment describes the playback device having only a playback function to play back a recording medium. The present invention, however, is not limited to the embodiment. For example, the playback device may be a recording/playback device having a recording function.

Although in the embodiments Java™ is used as a programming language for the virtual machine, other programming languages, such as B-Shell, Perl Script, ECMA Script, may also be used instead of Java™.

The data that is to be copied in the present invention is not limited to 2D images and may be 3D stereoscopic images.

The managed copy control unit described in the embodiments is required to perform high-load processing temporarily, since it is sometimes necessary to perform re-encoding depending on the copy destination. Accordingly, in the case where CPU performance of the playback device is not sufficient, the managed copy control unit may be incorporated in the LSI.

In the embodiment, the playback device that plays back the BD-ROM has been described. Naturally, however, a similar effect may be achieved if the required data on the BD-ROM, as described in the embodiments, is recorded on a writable optical recording medium.

INDUSTRIAL APPLICABILITY

A playback device of the present invention can be manufactured and distributed administratively, continuously, and repeatedly in the manufacturing industry. In particular, the device may be used in the movie and household appliance industries.

REFERENCE SIGNS LIST

101 Playback device
102 Remote controller
103 Output monitor
104 Removable medium
105 BD-ROM
106 Recordable-type BD drive
401 Read-only BD drive
402 Read control unit
403 Demultiplexer
404 Video decoder
405 Video plane
406 Audio decoder
407 Image memory
408 Image plane
409 Image decoder
410 Adder
411 Static scenario memory
412 Dynamic scenario memory
413 HDMV module
414 BD-J module
415 UO detection module
416 Mode management module
417 Dispatcher
418 Rendering engine
420 AV playback library
421 Network interface
422 Local storage
423 Managed copy control unit
601 Serial number read unit
602 Medium ID read unit
603 Medium state management unit
604 Copy execution unit
605 Copy state notification unit
606 Copy progress management unit
607 Nonce generation/write unit
608 Key information write unit
701 Java BD-J application
702 Medium playback module
703 Managed copy module
704 I/O module
705 Network module
706 BD-J application manager
S101 Step of checking one or more copy destination media
S102 Step of selecting one copy destination medium
S103 Step of managing free space
S104 Step of performing charging processing
S105 Step of acquiring element data for key information
S106 Step of acquiring the key information
S107 Step of performing a copy
S201 Step of imposing a disc access limitation
S202 Step of notifying copy start
S203 Step of copying data
S204 Step of lifting the disc access limitation
S205 Step of notifying copy end
S206 Step of notifying copy failure

The invention claimed is:

1. A playback device, comprising:
a platform on which applications are executed; an I/O module operable to provide an application loaded from a first recording medium with a function of accessing recording media;
a player operable to play back data;
a playback controller operable to read data from the first recording medium and supply the read data to the player, in response to a playback request issued by the application through the I/O module; and
a copier operable to read data from the first recording medium, and copy the read data into the second recording medium without passing through the I/O module, in response to a copy request issued by the application, wherein
when the application issues the copy request for commencing copying of the read data into the second recording medium while playback of the read data is performed, the playback controller and the I/O module both transition to a rejecting state of rejecting a request for data of the first recording medium from the application before copying of the read data is commenced, and while copying of the read data is performed, the application performs processing that is executable without using the first recording medium.

2. The playback device of claim 1, wherein
the data is read from the first recording medium by a read controller of the copier,
the read data is copied into the second recording medium by a copy controller of the copier, and
the copier copies the read data into the second recording medium without passing through the I/O module by instructing the read controller to supply the read data directly to the copy controller, and
the platform has a copy control application programming interface used to cause the copy controller to start the copying of the read data.

3. The playback device of claim 2, wherein
the player includes a demultiplexer and a decoder,
the playback controller includes an audiovisual playback library for controlling the demultiplexer and the decoder,
the platform includes a medium playback module having an audiovisual playback control application programming interface used by the application to call the audiovisual playback library,
during playback, the application controls the demultiplexer and the decoder with use of the called audiovisual playback library, and
while the copying is performed, the medium playback module rejects use of the audiovisual playback library by the application, and the copier controls the demultiplexer and the decoder with use of the audiovisual playback library.

4. The playback device of claim 3, wherein
once the copying starts, the audiovisual playback control application programming interface transitions from an accepting state of accepting a request from the application to a rejecting state of rejecting the request from the application.

5. The playback device of claim 3, wherein
the copying is a managed copy performed under management of a server connected with the playback device via a network, the copier includes a receiver operable to receive key information transmitted from the server and set the received key information in the copier, and the copying starts after the received key information is set in the copier.

6. The playback device of claim 4, wherein during reading of the data from the first recording medium and the copying of the read data into the second recording medium, the I/O module and the medium playback module are in the rejecting state, and the application performs the processing that is executable without using the first recording medium, and once the I/O module and the medium playback module make transitions to the accepting state, the application performs processing that is executable using the first recording medium.

7. The playback device of claim 2, wherein the copier includes a notifier operable to notify that reading of the data from the first recording medium has started and that the writing of the read data into the second recording medium has ended, and the copy control application programming interface includes a registration application programming interface to register an application to be notified by the notifier.

8. The playback device of claim 7, wherein when one of the reading of the data from the first recording medium and the writing of the read data into the second recording medium has failed, the notifier notifies the application registered by the registration application programming interface that the copying by the copier has failed.

9. The playback device of claim 7, further comprising:

a progress manager, wherein the progress manager notifies the application of a size of data that has been written to the second recording medium and a size of data that remains to be written, in response to a call for a size notification application programming interface made by an application.

10. A playback method for use in a playback device including an I/O module and a player, the playback method comprising:

in response to a playback request issued by an application through the I/O module, reading data from a first recording medium and causing the player to play back the read data; and in response to a copy request issued by the application, reading the data from the first recording medium, and copying the read data into a second recording medium without passing through the I/O module, wherein when the application issues the copy request for commencing copying of the read data into the second recording medium while playback of the read data is performed, a playback controller of the playback device and the I/O module both transition to a rejecting state of rejecting a request for data of the first recording medium from the application before copying of the read data is commenced, and while the copying is performed the application performs processing that is executable without using the first recording medium.

11. A non-transitory computer-readable recording medium having recorded thereon a program for causing a computer to perform one of playback and copying while executing an application, the computer including:
an I/O module; and
a player,
the program causing the computer to:
in response to a playback request issued by the application through the I/O module, reading data from a first recording medium and causing the player to play back the read data; and
in response to a copy request issued by the application, reading the data from the first recording medium, and copying the read data into a second recording medium without passing through the I/O module, wherein
when the application issues the copy request for commencing copying of the read data into the second recording medium while playback of the read data is performed, the player and the I/O module both transition to a rejecting state of rejecting a request for data of the first recording medium from the application before copying of the read data is commenced, and while the copying is performed, the application performs processing that is executable without using the first recording medium.

12. The playback device of claim 1, wherein, while the copying is performed, the application displays information in accordance with an extent to which the copying has progressed.

13. The playback device of claim 1, further comprising:

a cache memory, wherein the application displays information in accordance with an extent to which the copying has progressed by using data read into the cache memory.

14. The playback device of claim 13, wherein the application is a bytecode application that is an instance of a class file existing within an archive file, and the archive file includes data to be used by the bytecode application, when executed, and is read to the cache memory prior to commencement of the copying.

* * * * *